(12) United States Patent
Boetcker

(10) Patent No.: US 6,314,955 B1
(45) Date of Patent: Nov. 13, 2001

(54) COLLAPSIBLE BARBEQUE AND COOKING STOVE

(76) Inventor: Richard C. Boetcker, 108 Plumtree La., #19E, Midvale, UT (US) 84047

(*) Notice: Subject to any disclaimer, the term of this patent is extended or adjusted under 35 U.S.C. 154(b) by 0 days.

(21) Appl. No.: 09/488,655

(22) Filed: Jan. 20, 2000

(51) Int. Cl.$^7$ .............. F24C 1/16; F24C 15/08; F24B 3/00
(52) U.S. Cl. .......... 126/9 R; 126/25 R; 126/38; 126/9 B; 126/304 R; 126/305; 126/306
(58) Field of Search .............. 126/9 R, 38, 25 R, 126/9 B, 304 R, 304 A, 305, 306, 50, 39 B

(56) References Cited

U.S. PATENT DOCUMENTS

| | | |
|---|---|---|
| D. 379,900 | 6/1997 | Gillam et al. . |
| D. 387,240 | 12/1997 | Simmonds et al. . |
| 2,397,766 * | 4/1946 | Tullis .............. 126/304 R |
| 2,607,334 * | 8/1952 | Pearlman . |
| 3,791,368 | 2/1974 | Hunt . |
| 4,026,265 | 5/1977 | Spadaro . |
| 4,046,132 | 9/1977 | White . |
| 4,069,806 * | 1/1978 | Landry ............. 126/9 R |
| 4,140,099 | 2/1979 | Newport . |
| 4,508,024 | 4/1985 | Perkins . |
| 4,909,235 | 3/1990 | Boetcker . |
| 5,024,208 | 6/1991 | Hottenroth et al. . |
| 5,094,223 | 3/1992 | Gonzalez . |
| 5,179,932 * | 1/1993 | Decarlo ............. 126/9 R |
| 5,299,931 | 4/1994 | Lee . |
| 5,404,864 | 4/1995 | Kent, Jr. . |
| 5,413,087 | 5/1995 | Jean . |
| 5,425,352 | 6/1995 | Gillam et al. . |
| 5,687,704 | 11/1997 | Lerch et al. . |
| 5,797,386 | 8/1998 | Orr . |

FOREIGN PATENT DOCUMENTS

1017762  * 10/1957  (DE) ........................ 126/38

OTHER PUBLICATIONS

Catalog page, "Folding Portable Stainless Steel Cooker For Easy Toting", *Absolute Amenities*, p. 23, (No Date).

* cited by examiner

Primary Examiner—Carl D. Price
(74) Attorney, Agent, or Firm—TraskBritt

(57) ABSTRACT

A collapsible cooking stove including a lower housing, an upper housing, a fire chamber assembly, and at least one lef mechanism. The upper housing and fire chamber assembly are interconnected by a pair of mating flanges disposed on the upper housing and fire chamber assembly. The fire chamber assembly is interconnected with the lower housing by at least one retaining clasp associated with the fire chamber assembly that interfaces with a retaining surface located on the lower housing. The upper housing and lower housing are further interconnected by the at least one collapsing leg mechanism, which has a leg rotationally affixed to the upper housing and a linkage member rotationally affixed to both the leg and the lower housing. The collapsible cooking stove can be uncollapsed for cooking by lifting upwards on the upper housing, preferably using a bail attached to the upper housing. The collapsible stove is useful for many types of cooking and is adaptable for use with a number of utensils including a cooking plate, a grill, a wok, a Dutch oven, and a rotisserie. After use, the collapsible cooking stove can be collapsed for storage by lifting upwards on the lower housing, preferably at the bottom edge. In the collapsed condition, the collapsible cooking stove is characterized by minimal volume and low aspect ratio.

21 Claims, 20 Drawing Sheets

COLLAPSIBLE BARBEQUE AND COOKING STOVE

BACKGROUND OF THE INVENTION

Field of the Invention: The present invention relates generally to outdoor cooking devices that use charcoal briquettes, wood, or other solid fuels as a source of energy. Specifically, the present invention relates to a portable, collapsible cooking stove that can be adapted for use with various cooking utensils, such as a barbeque grill, frying pan, pot, steamer, Dutch oven, wok, or rotisserie.

State of the Art: Outdoor cooking devices, such as charcoal and gas barbeques, have been widely used for many years and numerous designs exist in the prior art. Typically, these devices consist of a grill located above a fuel source that is contained within some form of a fuel chamber. Food is then placed on the grill for cooking. Conventional outdoor cooking stoves share a number of common weaknesses including lack of portability, lack of utility, inadequate control of air flow to the fuel, and inadequate venting and cooling of the outer stove surfaces resulting in a burn hazard.

Portability can be an important feature of an outdoor stove, as these devices are often transported away from the user's home to recreation areas and camping sites. Many prior art cooking devices have attempted to overcome the lack of portability. U.S. Pat. No. 5,797,386 to Orr; U.S. Pat. No. 5,687,704 to Lerch et al.; U.S. Pat. No. 5,425,352 to Gillam et al.; U.S. Pat. No. 5,413,087 to Jean; U.S. Pat. No. 5,404,864 to Kent, Jr.; U.S. Pat. No. 5,024,208 to Hottenroth et al.; U. S. Pat. No. 4,909,235 to Boetcker; U.S. Patent No. 4,140,099 to Newport; and U.S. Patent No. 4,046,132 to White all disclose portable, outdoor cooking devices.

A volume-efficient method of achieving portability is the utilization of a collapsible stove structure. Prior art cooking stoves such as the Newport and Kent devices provide portability using a collapsible stove structure. However, in order to collapse the stove for transportation or storage, all of these devices must be manually disassembled. Furthermore, after being collapsed for storage, manual reassembly is required before any of these stoves can be used again for cooking. Thus, a need exists for a volume-efficient, collapsible stove that is simple to both assemble for cooking and collapse for storage. In addition, such a collapsible stove should be easily adapted to different cooking methods and utensils, provide adequate control of air flow to the fuel, and allow for adequate cooling of the outer stove surfaces to reduce the potential burn hazard.

BRIEF SUMMARY OF THE INVENTION

The present invention is a collapsible outdoor cooking stove that is simple to use, adaptable to various cooking methods, provides the user with adequate control over air flow to the fuel, provides for adequate cooling of the exterior surfaces, and is space-efficient, in terms of both overall volume and aspect ratio (ratio of height over diameter). Note that, while other conventional devices may have a small volume, volume is not the only factor affecting portability. A low-volume stove may lack portability due to its shape and configuration, exterior protrusions, and high aspect ratio.

The collapsible cooking stove of the present invention is comprised of an upper housing, a fire chamber assembly, a lower housing, a cooking plate, and a plurality of collapsing leg mechanisms. Located within the fire chamber assembly is a fire housing and a fuel pan, both of which include vent holes. Rotational interaction between the fire housing vent holes and fuel pan vent holes allows the user to effectively control the flow of air to the fuel. An annular air space, located in a region bounded by the fire housing, the upper housing, and the lower housing, facilitates the convective cooling of the outer surfaces of both the upper and lower housings. Air holes in the outer walls of the upper and lower housings serve as air intakes for both the annular air space and the (fuel) air flow control system.

An individual collapsing leg mechanism is comprised of a leg rotatably attached to the upper housing and a linkage rotatably attached to the lower housing. In the collapsed condition, each leg of the plurality of collapsing leg mechanisms is folded underneath the lower housing. Also, the upper housing collapses into, and rests entirely within, the lower housing. Thus, the collapsed stove is characterized by minimum volume and a low profile (small aspect ratio).

In the uncollapsed condition, the upper housing is raised above, and adjacent to, the lower housing, and the leg and linkage of each collapsing leg mechanism are rotated outward away from the housings until the linkage is fully extended. Uncollapsing the stove can be achieved by simply pulling upwards on the upper housing, a task that can be facilitated by attaching a handle or bail to the upper housing. In the fully extended position, the leg mechanisms act, in conjunction with a series of interlocking flanges disposed on the upper, fire, and lower housings, to lock the cooking stove in the uncollapsed position. Applying a downward force to the stove will not cause the stove to collapse. Collapsing the stove may be effected by pulling upwards on the lower housing until the leg of each collapsing leg mechanism is positioned underneath, and the upper housing is resting within, the lower housing.

The dimensions and orientation of the collapsible cooking stove, while in the uncollapsed condition, are such that numerous cooking methods and utensils can be easily integrated with the stove. For example, the cooking stove is easily adapted for use with a Dutch oven, a wok, a frying pan, a pot, a steamer, or a rotisserie. Additional flexibility may be added to the present invention by combining the collapsible stove with a second identical, but smaller, collapsible stove. The smaller stove, while collapsed, may be stowed within the interior of the larger stove, when also in the collapsed position.

BRIEF DESCRIPTION OF THE DRAWINGS

While the specification concludes with claims particularly pointing out and distinctly claiming that which is regarded as the present invention, the features and advantages of this invention can be more readily ascertained from the following detailed description of the invention when read in conjunction with the accompanying drawings, in which:

DETAILED DESCRIPTION OF THE PREFERRED EMBODIMENTS

Figure 1:
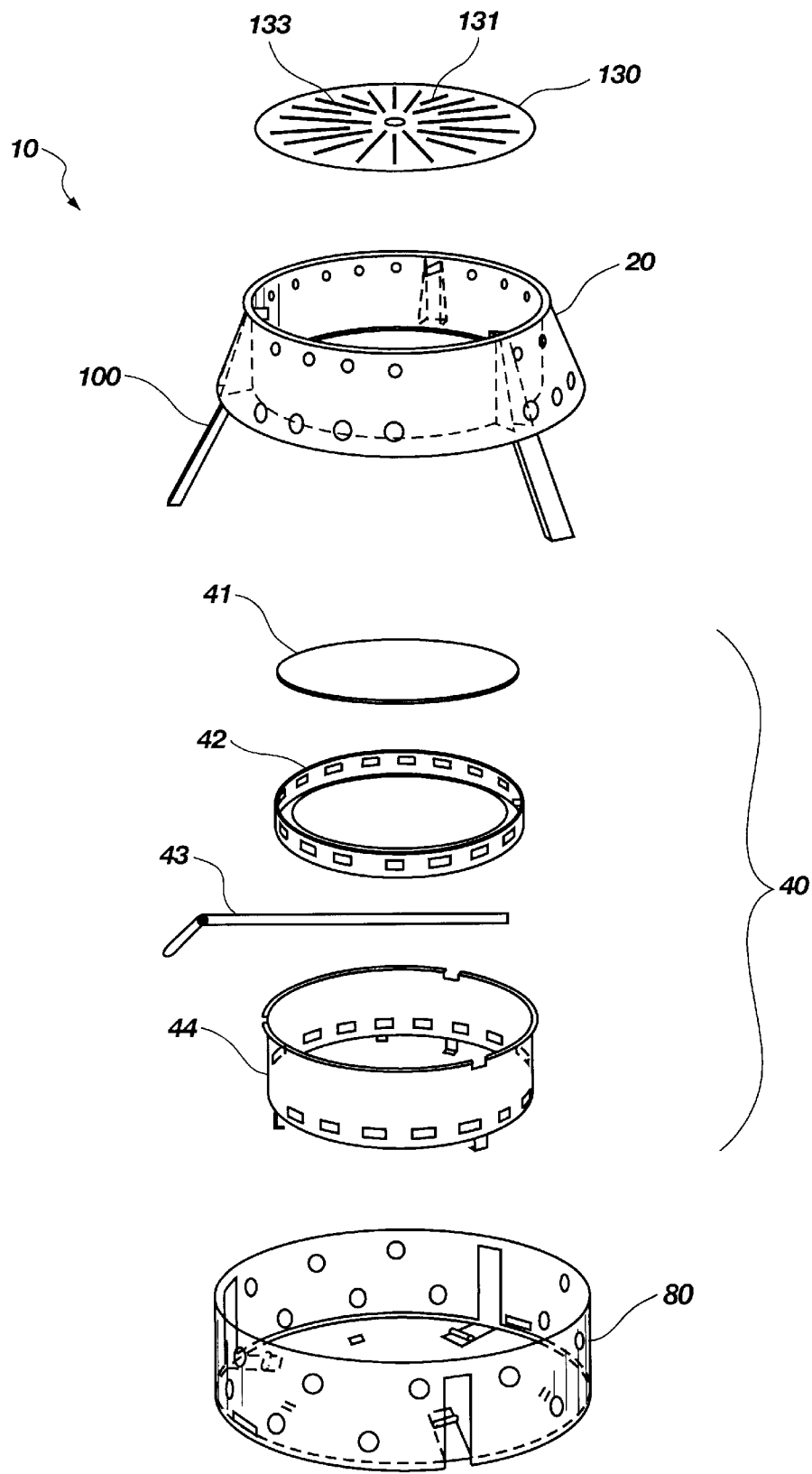
FIG. 1 is an expanded perspective view of the collapsible cooking stove of the present invention.

FIG. 1 shows a collapsible cooking stove according to this invention. The collapsible stove 10 includes an upper housing 20, a fire chamber assembly 40, a lower housing 80, and a plurality of collapsing leg mechanisms 100 (see FIG. 2). Also shown in FIG. 1 is a removable cooking plate 130. The terms "collapsible stove," "cooking stove" and "stove" are used synonymously herein. Additionally, the terms "cooking plate" and "grill" may be used synonymously herein.

Figure 2:
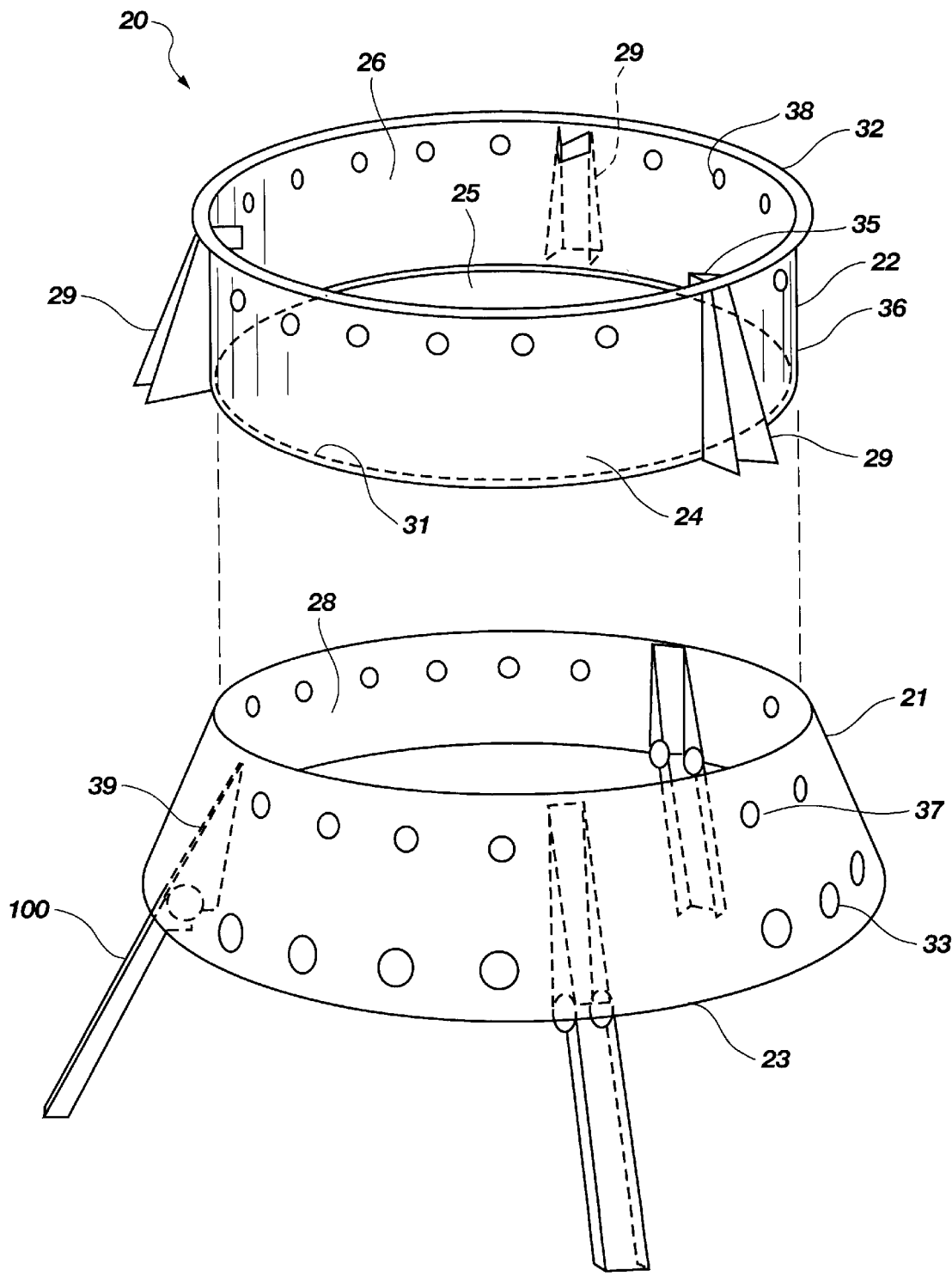
FIG. 2 is an expanded perspective view of the upper housing of the collapsible cooking stove in accordance with the invention.

Referring to FIG. 2, an expanded perspective view of the upper housing 20 is shown. The upper housing 20 includes a frustoconically shaped outer wall 21 and a cylindrically shaped inner wall 22. Though shown in expanded view, it should be recognized that the frustoconical outer wall 21 is rigidly attached to the inner wall 22 to form a unitary upper housing 20. To provide structural rigidity to the upper housing 20, a plurality of struts 29 may be disposed in the region between the inner wall 22 and the outer wall 21. Rigidly attached to the inside surface 28 of outer wall 21 is a plurality of brackets 39. Collapsing leg mechanisms 100 are rotatably attached to the upper housing 20 via the brackets 39.

Located at the bottom of inner wall 22 is an inward-facing flange 31. At the top of inner wall 22 is an outward-facing flange 32. At the bottom of inner wall 22, an opening 24 is formed by the inside circumference of flange 31. Inner wall 22 surrounds a cylindrical cavity 25. Disposed in the outer wall 21 are two encircling sets of air holes 33, 37. The inner wall 22 includes air holes 38, which are approximately aligned with air holes 37 in outer wall 21. The air holes 33, 37, 38 provide for the flow of hot air out of the collapsible stove 10, which is described in greater detail below. A bail (not shown) may be rotatably affixed to the outer wall 21.

Disposed on the inside surface 26 of inner wall 22 are cantilevered plate supports 35, which may support a removable cooking plate 130 (FIG. 1) during use. The location of plate supports 35 on the inside surface 26 of inner wall 22 should be such that the cooking surface 131 (see FIG. 1) of cooking plate 130 is approximately level with the flange 32.

The preferred embodiment of the collapsible stove 10 includes three cantilevered plate supports 35 disposed on the inner wall 22, spaced equidistantly about the circumference of the inside surface 26 to provide a stable support structure for a cooking plate 130. However, a uniform inward-facing flange (not shown) could be used to support a cooking plate 130. Such a uniform inward-facing flange would make it difficult to store a cooking plate 130 (of greater diameter than the uniform inward-facing flange) inside the cylindrical cavity 25 unless cutouts were provided on the cooking plate 130 to facilitate its insertion into the cylindrical cavity 25. For this reason, cantilevered plate supports 35 are preferred over a uniform inward-facing flange for supporting the cooking plate 130 as the narrow profile cantilevered plate supports 35 allow for the insertion of the cooking plate 130 into the collapsible stove 10 below the cantilevered plate supports 35, as will be explained in greater detail below with reference to FIG. 12.

Figure 3:
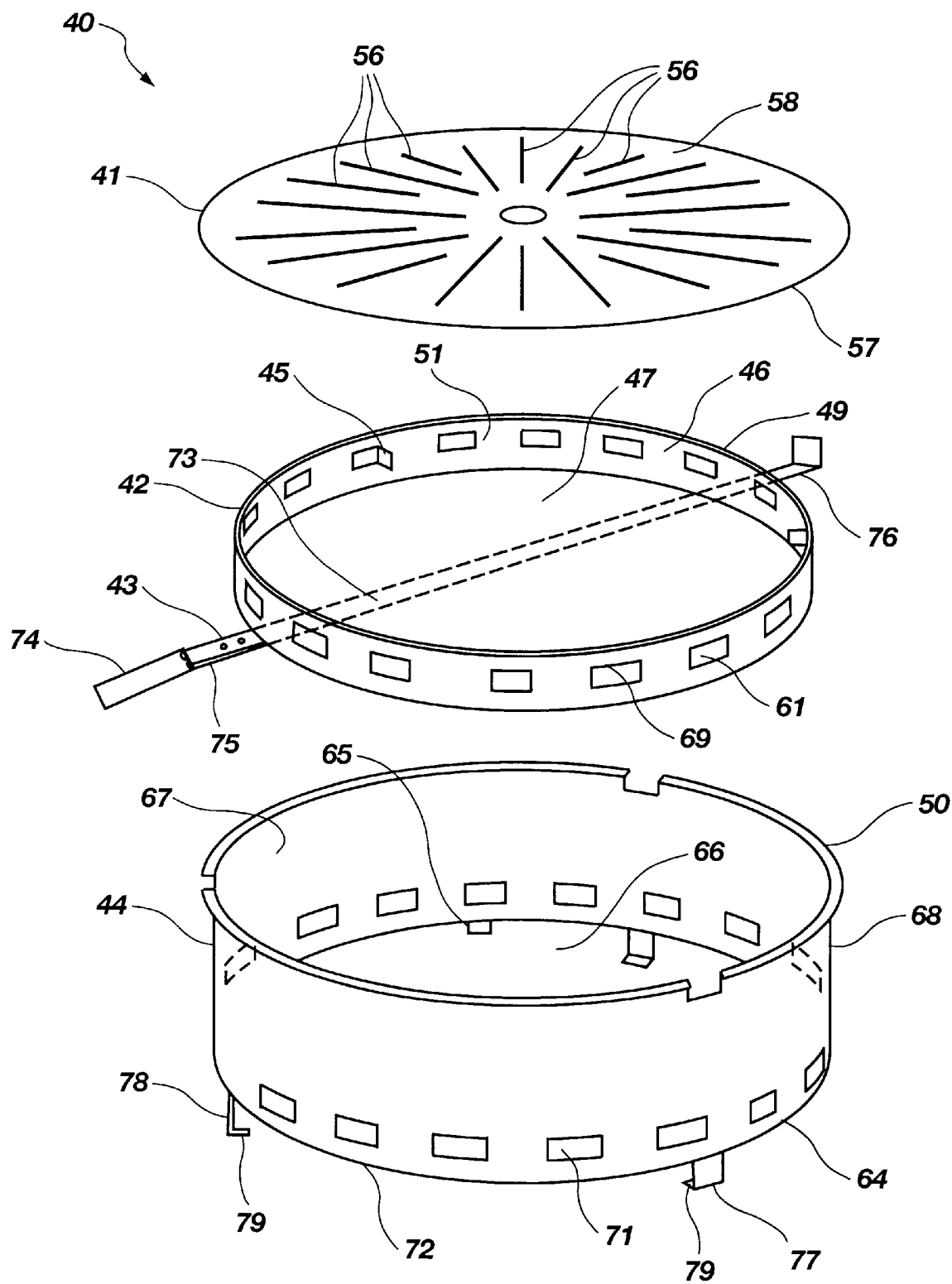
FIG. 3 is an expanded perspective view of the fire chamber assembly of the collapsible cooking stove in accordance with the invention.

Referring to FIG. 3, the fire chamber assembly 40 may include a fuel grate 41, a fuel pan 42, a vent control lever 43, and a fire housing 44. The fuel pan 42 includes a cylindrical wall 46 and a base plate 47. Disposed about the inside surface 51 of cylindrical wall 46 are cantilevered grate supports 45. At least three grate supports 45 may be disposed on the cylindrical wall 46, spaced equidistantly about the circumference of inside surface 51. The fuel grate 41 is removably placed upon the grate supports 45, wherein the lower surface 57 of fuiel grate 41 makes contact with the grate supports 45. During use, fuel (not shown) is placed upon the upper surface 58 of fuel grate 41. Ash produced by the burning of fuel in the fire chamber assembly 40 may fall through a plurality of openings 56 in the fuel grate 41 and collect in fuel pan 42. The plurality of openings 56 may be radial openings, as illustrated in FIG. 3, or any other arrangement of openings that provides ventilation between the fuel pan 42 and the upper surface 58 of fuel grate 41, allowing ash to fall into the fuel pan 42 and maintaining the structural integrity of the fuel grate 41 when loaded with fuel and operating at high temperatures.

Located about the circumference of cylindrical wall 46 are pan vent holes 61. In the illustrated embodiment of the fire chamber assembly 40, the placement of pan vent holes 61 relative to grate supports 45 is such that, when the fuel grate 41 rests on the grate supports 45, the lower surface 57 of fuel grate 41 is approximately level with the upper edge 69 of pan vent holes 61. In addition, the location of the grate supports 45 is such that the upper surface 58 of fuel grate 41 does not extend above the top edge 49 of cylindrical wall 46.

An alternative embodiment of a fire chamber assembly 40 may include two fuel grates 41 placed upon each other. By selectively rotating the two fuel grates 41 relative to one another, the plurality of openings 56 may be caused to align, providing full ventilation, or caused to be out of alignment, providing minimal ventilation, or any variation between those two (full and minimal ventilation) extremes. Any suitable means for causing the two fuel grates 41 to rotate relative to one another may be included with the alternative embodiment of a fire chamber assembly 40. In the alternative embodiment of a fire chamber assembly 40 that includes two fuel grates 41 placed upon each other, additional control over cooking time and temperature may be obtained. In the alternative embodiment of a fire chamber assembly 40 that includes two fuel grates 41, the symmetry of the openings 56 allows two plates to restrict air flow and heat above the coals in the fire chamber assembly 40.

Fire housing 44 includes a cylinder 64 that forms a fire chamber 66. The diameter of the fire chamber 66 is sufficient to allow for the placement of the fuel pan 42 inside the cylinder 64, wherein the fuel pan 42 is free to rotatably slide relative to cylinder 64. The upper edge of the cylinder 64 is bent outward to form a flange 50. The diameter of the outer surface 68 of cylinder 64 is dimensioned such that the fire housing 44 can be slidably disposed within the cylindrical cavity 25 of upper housing 20, see FIG. 2. Disposed on the inner surface 67 of cylinder 64 are cantilevered pan supports 65. At least three pan supports 65 are disposed on the cylinder 64, spaced equidistantly about the circumference of the inside surface 67. The fuel pan 42 slidably rests upon the pan supports 65 within cylinder 64.

Extending from the lower edge 72 of cylinder 64 are retaining clasps 77. The retaining clasps 77 are formed of a longitudinal extension 78 and a flange 79. At least three retaining clasps 77 may be disposed on cylinder 64, spaced equidistantly about the circumference of the lower edge 72. The retaining clasps 77 work, in conjunction with other features of the collapsible stove 10, to prevent the separation of the lower housing 80 from the upper housing 20 and fire chamber assembly 40 when uncollapsing the collapsible stove 10, as explained in greater detail below. Alternatively, a retaining clasp 77 may be formed as a bolt (not shown) rigidly attached to the cylinder 64 wherein the bolt head and shaft function as the flange 79 and longitudinal extension 78, respectively.

Located around the circumference of the cylinder 64 are housing vent holes 71. The placement of housing vent holes 71 relative to pan supports 65 is such that, when the fuel pan 42 is inserted into cylinder 64 and the fuel pan 42 is slidably resting upon pan supports 65, the housing vent holes 71 and pan vent holes 61 may be approximately concentric upon the proper angular positioning of the fuel pan 42. In the preferred embodiment, there are equal numbers of housing vent holes 71 and pan vent holes 61, and the housing vent holes 71 and pan vent holes 61 are of equal size, shape, and orientation. The vent holes 61, 71 allow for the flow of air into the fire chamber 66, a function that will be described later in more detail.

Located adjacent the base plate 47 of fuel pan 42 is a vent control lever 43, see FIG. 3. The vent control lever 43 includes an arm 73, with opposing ends 75 and 76, and a bail 74. Preferably, the bail 74 is rotatably attached to the end 75 of arm 73 in order to facilitate ease of use, storage, and collapsibility. The arm 73 on vent control lever 43 is preferably affixed to the fuel pan 42 by sliding the arm 73 through slots (not shown for clarity) protruding from the fuel pan 42. This protruding slot arrangement is preferred over welds because thermal cycling during use of the collapsible stove 10 may weaken a weld. Alternative fastening means for fixing the arm 73 relative to the fuel pan 42 include rivets, nuts and bolts, and other fasteners. However, a minimum of fastening means is preferable to simplify the design, manufacturing and durability of the collapsible stove 10.

Figure 4:
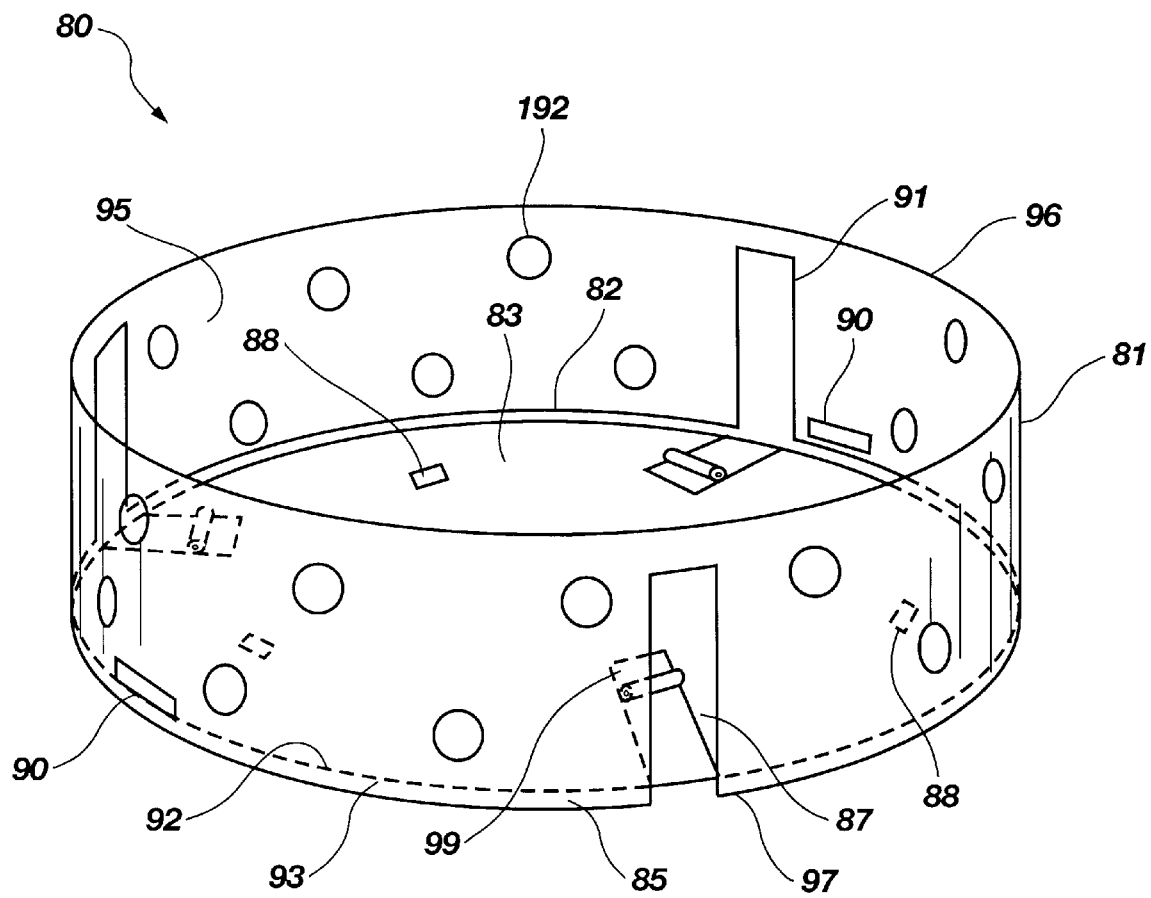
FIG. 4 is a perspective view of the lower housing of the collapsible cooking stove in accordance with the invention.

Referring also to FIG. 4, the end 75 of arm 73 extends outside the lower housing 80 via slots 90 located on the lower housing 80. During use, the operator can rotate the fuel pan 42 relative to fire housing 44 by grasping the bail 74 and manually manipulating (i.e., applying a rotational torque to) the vent control lever 43 to position the vent holes 61 and 71 as desired. In a preferred embodiment, the end 76 of arm 73 also extends through a slot 90 to the exterior of lower housing 80. The extension of the end 76 of arm 73 through the lower housing 80 facilitates stability and ease of rotation of the fuel pan 42. In an alternative embodiment, a second bail (not shown) may be rotatably attached to the end 76 of arm 73 for ease of use.

The ability to rotate the fuel pan 42 relative to fire housing 44 provides a system for controlling the volume of air flow to the fuel. The volume of air, and hence oxygen, reaching the fuel burning within collapsible stove 10 significantly affects the energy output of the collapsible stove 10. Therefore, the ability to control air flow into the collapsible stove 10 provides the operator a means to control the cooking temperature. When rotating the fuel pan 42 relative to fire housing 44, the pan vent holes 61 rotate relative to the housing vent holes 71. The number and dimensions of pan vent holes 61 and housing vent holes 71 are such that the vent holes 61 and 71 may be either concentrically aligned or completely out of alignment. In the misaligned condition, no portion of the pan vent holes 61 should overlap any portion of the housing vent holes 71.

The vent control lever 43 will provide maximum air flow to the fuel in the fully open condition where the vent holes 61 and 71 are concentrically aligned. Alternatively, no air flow is provided if the vent control lever 43 is in the fully closed condition where the vent holes 61 and 71 are out of alignment. Between the fully open and fully closed conditions, the vent control lever 43 can be maintained at an infinite number of settings, thus providing the user with a broad range of control over cooking time and temperature.

Referring to FIG. 4, a preferred embodiment of a lower housing 80 is illustrated. The lower housing 80 includes a cylinder 81 and a base plate 82. The upper edge 96 of cylinder 81 may form a chamfer or fillet (not shown). Located 180 degrees apart on cylinder 81 are two opposing slots 90 that provide for the insertion of, and access to, the vent control lever 43. Disposed about the circumference of cylinder 81 are air holes 192, which provide for air flow into the cylindrical space 83 bounded by the cylinder 81 and base plate 82.

Located in the base plate 82 are vias 88, wherein the dimensions and locations of vias 88 are such that the longitudinal extensions 78 of retaining clasps 77 (see FIG. 3) are slidably disposed within the vias 88. The vias 88 and flanges 79 of retaining clasps 77 are dimensioned such that an interference fit is formed between the vias 88 and flanges 79. Thus, the outer surface 93 of base plate 82 surrounding the vias 88 forms a retaining surface, and the flanges 79 will abut the retaining surface, preventing the separation of the fire housing 44 away from the lower housing 80.

Disposed on the circumference of cylinder 81 is a plurality of cutouts 91, and located adjacent the cutouts 91 on base plate 82 is a plurality of mating cutouts 87. The cutouts 87, 91 allow for clearance between the lower housing 80 and the plurality of collapsing leg mechanisms 100, see FIG. 2. Rigidly affixed to the outer surface 93 of base plate 82, at a location proximate the cutouts 87, are brackets 99. Collapsing leg mechanisms 100 are rotatably attached to the lower housing 80 at the brackets 99 via linkage 115, see FIG. 5.

Referring again to FIG. 4, the lower edge 97 of cylinder 81 extends below the base plate 82, forming a cylindrical region 85. In the collapsed state, the cylindrical region 85 provides a space for the legs 110 of collapsing leg mechanism 100 to fold into. The legs 110, when resting in the cylindrical region 85 and placed on a level surface, are protected from damage because the collapsible stove 10 is supported by lower edge 97. Extending the lower edge 97 below the base plate 82 may also facilitate the attachment of the base plate 82 to cylinder 81, by providing additional surface area for rivets, screws, welding, or any other similar attachment method known to one of ordinary skill in the art.

Figure 5:
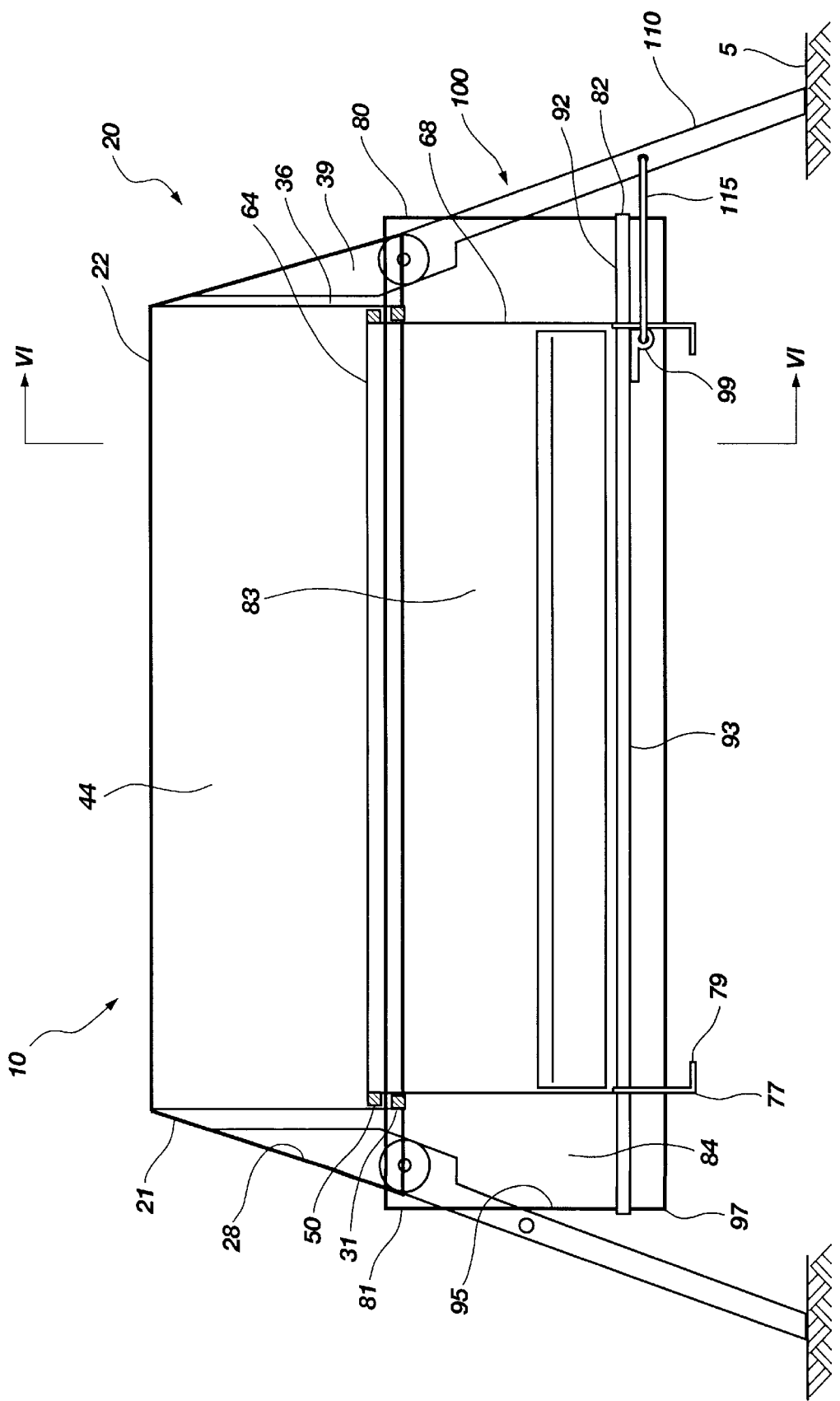
FIG. 5 is a cross-sectional view of the collapsible stove in the uncollapsed condition in accordance with the invention.

As shown in the cross-sectional view of FIG. 5, in an uncollapsed state, the fire housing 44 is disposed within the cylindrical space 83 of lower housing 80, and the upper housing 20 is concentrically located above, and adjacent to, the lower housing 80. An annular air space 84 is formed in the region bounded by the upper surface 92 of base plate 82, the inside surface 95 of cylinder 81, the outer surface 68 of cylinder 64, the outside surface 36 of cylindrical inner wall 22 of upper housing 20, and the inside surface 28 of frustoconical outer wall 21 of upper housing 20. Referring also to FIG. 4, the air holes 192 on lower housing 80 in conjunction with the air holes 33, 37 on upper housing 20 allow for air flow into the annular air space 84. Air flowing into annular air space 84 serves two functions. First, it allows for air to be drawn into the vent holes 61, 71 of fire chamber assembly 40. Second, it assists in the convective cooling of the cylinder 81 of lower housing 80 and the frustoconical outer wall 21 of upper housing 20, thus reducing a potential burn hazard.

Figure 6:
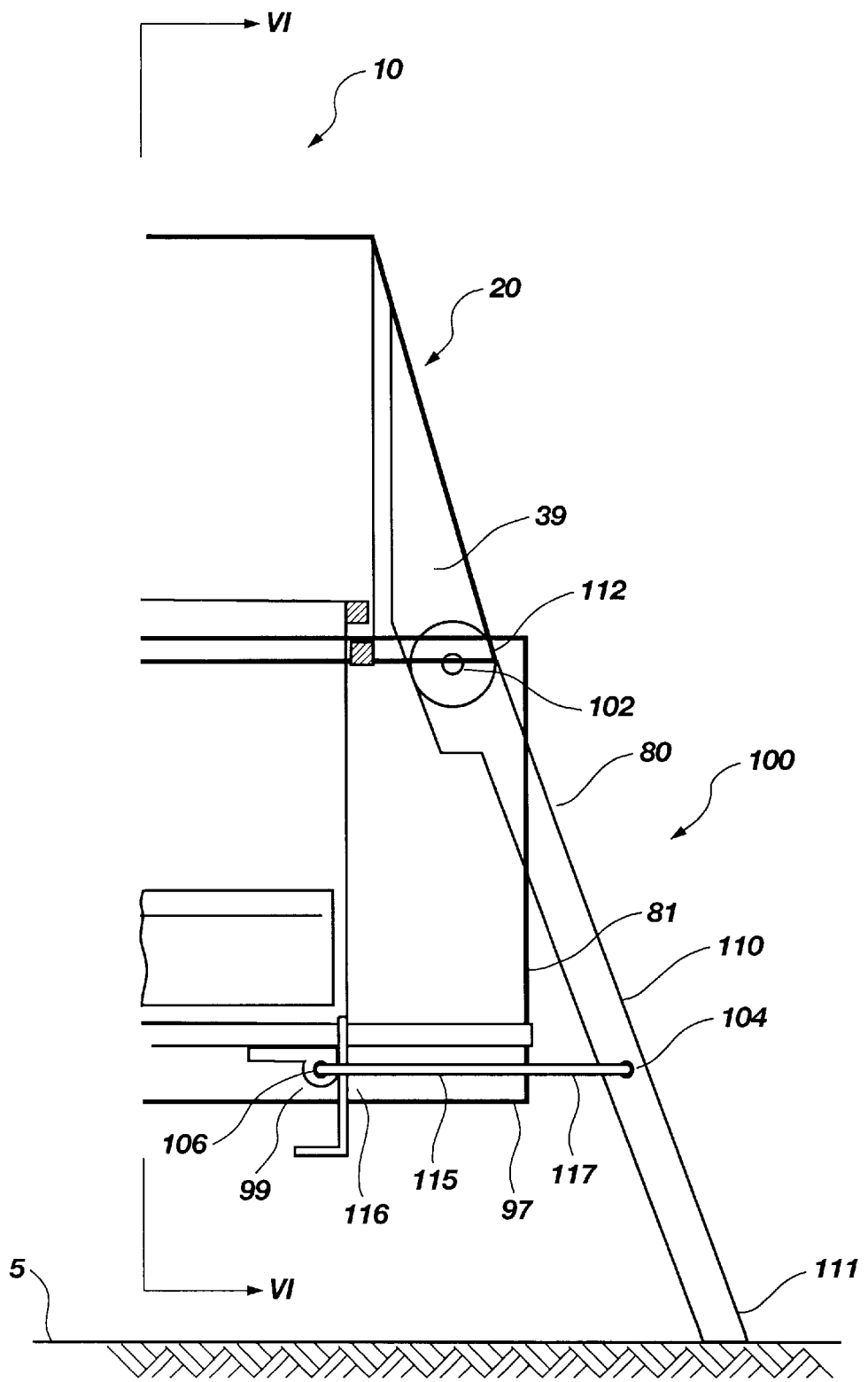
FIG. 6 is a cross-sectional view of a collapsing leg mechanism of the collapsible cooking stove in accordance with the invention.

FIG. 6 is a cross-section of the collapsible stove 10 taken along the line VI-VI as shown in FIG. 5. Referring to FIG. 6, a collapsing leg mechanism 100 is shown in the uncollapsed, folded-out position. For optimum stability during use, the preferred embodiment includes three leg mechanisms 100 affixed to the collapsible stove 10. In the preferred embodiment, each collapsing leg mechanism 100 includes a leg 110, a linkage 115, and three rotation joints 102, 104, 106. The upper end 112 of leg 110 is rotatably attached to the upper housing 20 at bracket 39 by means of the rotation joint 102. In the uncollapsed position, the lower end 111 of leg 110 makes contact with the surface 5 upon which the collapsible stove 10 is placed. The outer end 117 of linkage 115 is rotatably attached to the leg 110 at rotation joint 104. The inner end 116 of linkage 115 is rotatably attached to the lower housing 80 at bracket 99 by means of the rotation joint 106.

Figure 7:
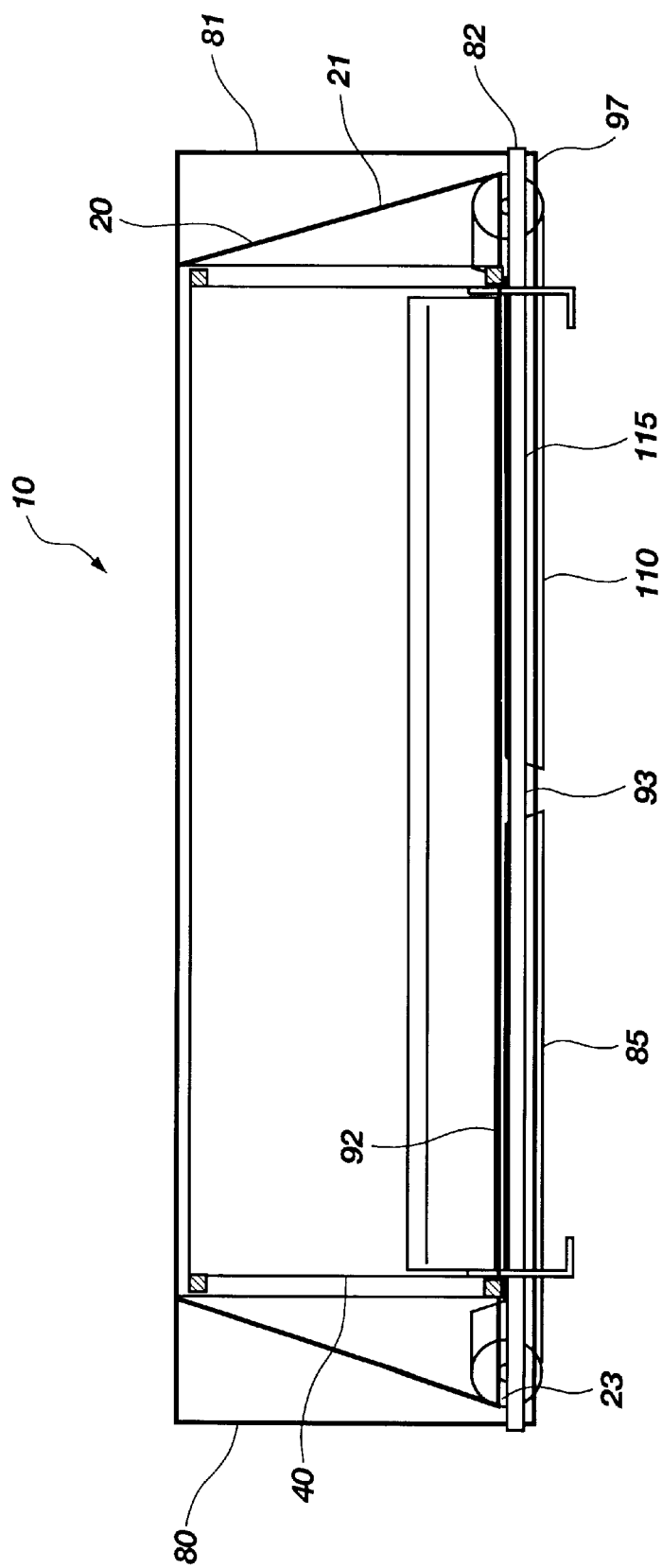
FIG. 7 is a cross-sectional view of the collapsible stove in the collapsed condition in accordance with the invention.
Figure 8:
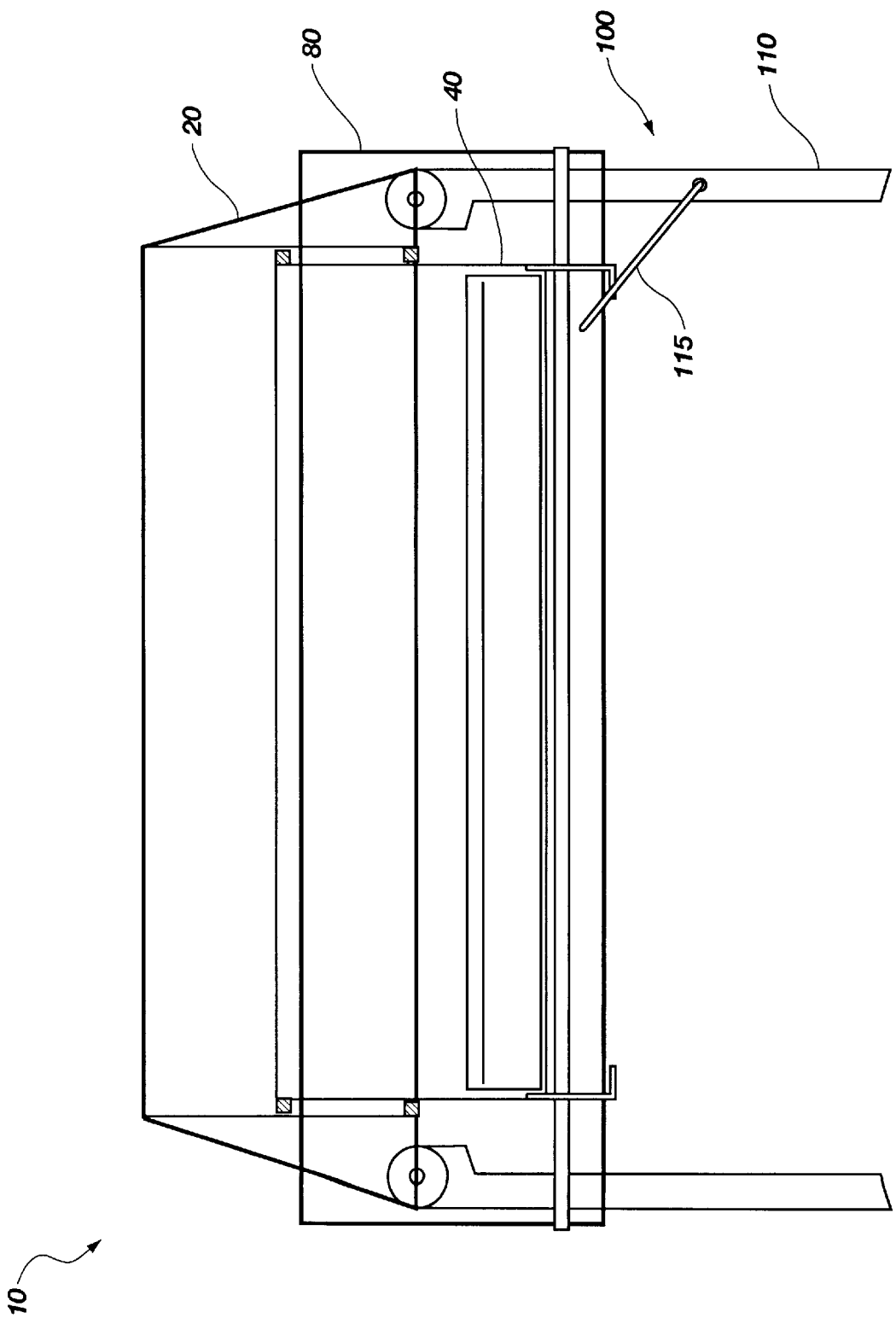
FIG. 8 is a cross-sectional view of the collapsible stove in a condition between the collapsed and uncollapsed conditions.
Figure 9:
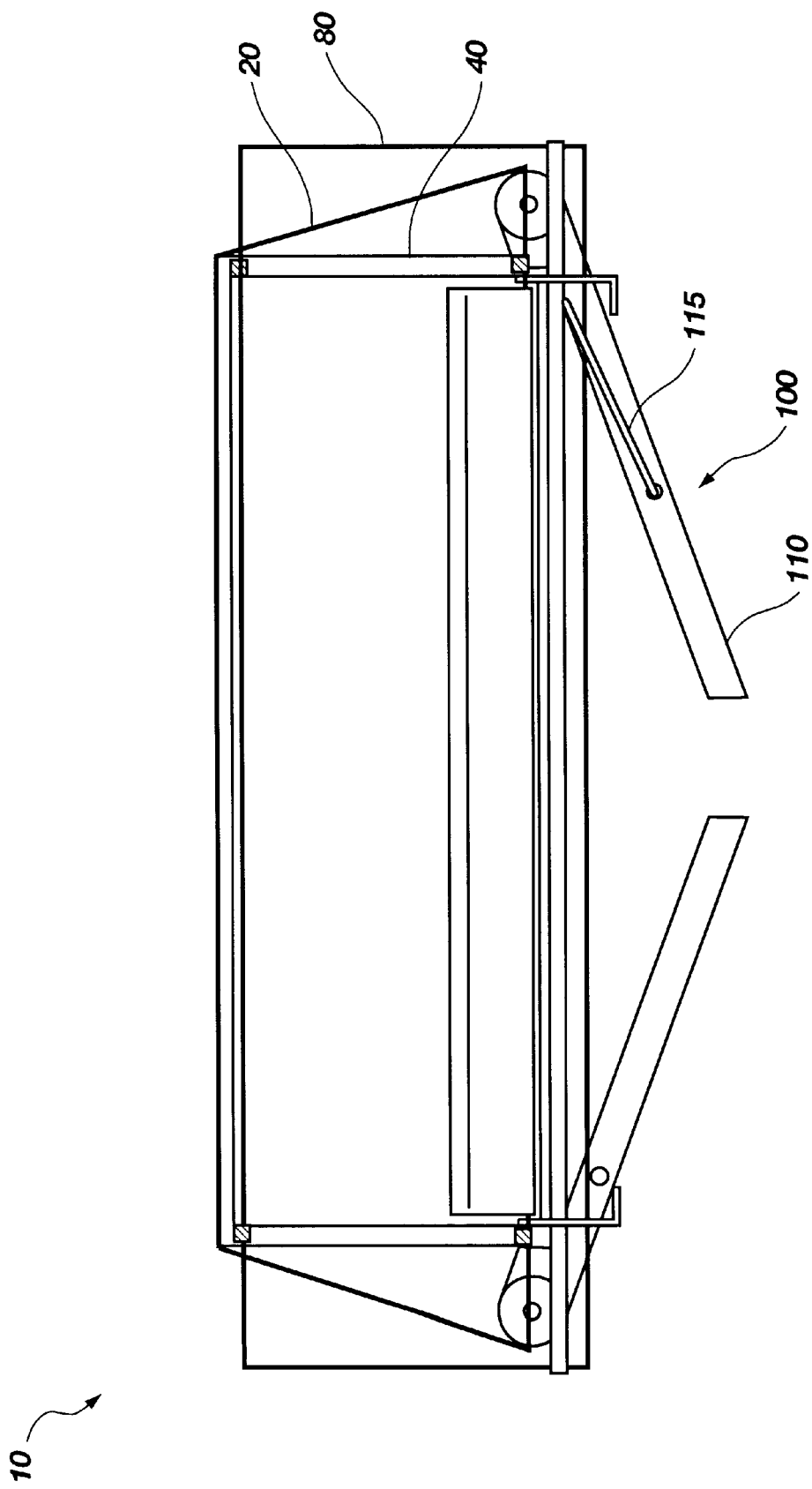
FIG. 9 is another cross-sectional view of the collapsible stove in a condition between the collapsed and uncollapsed conditions.
Figure 10:
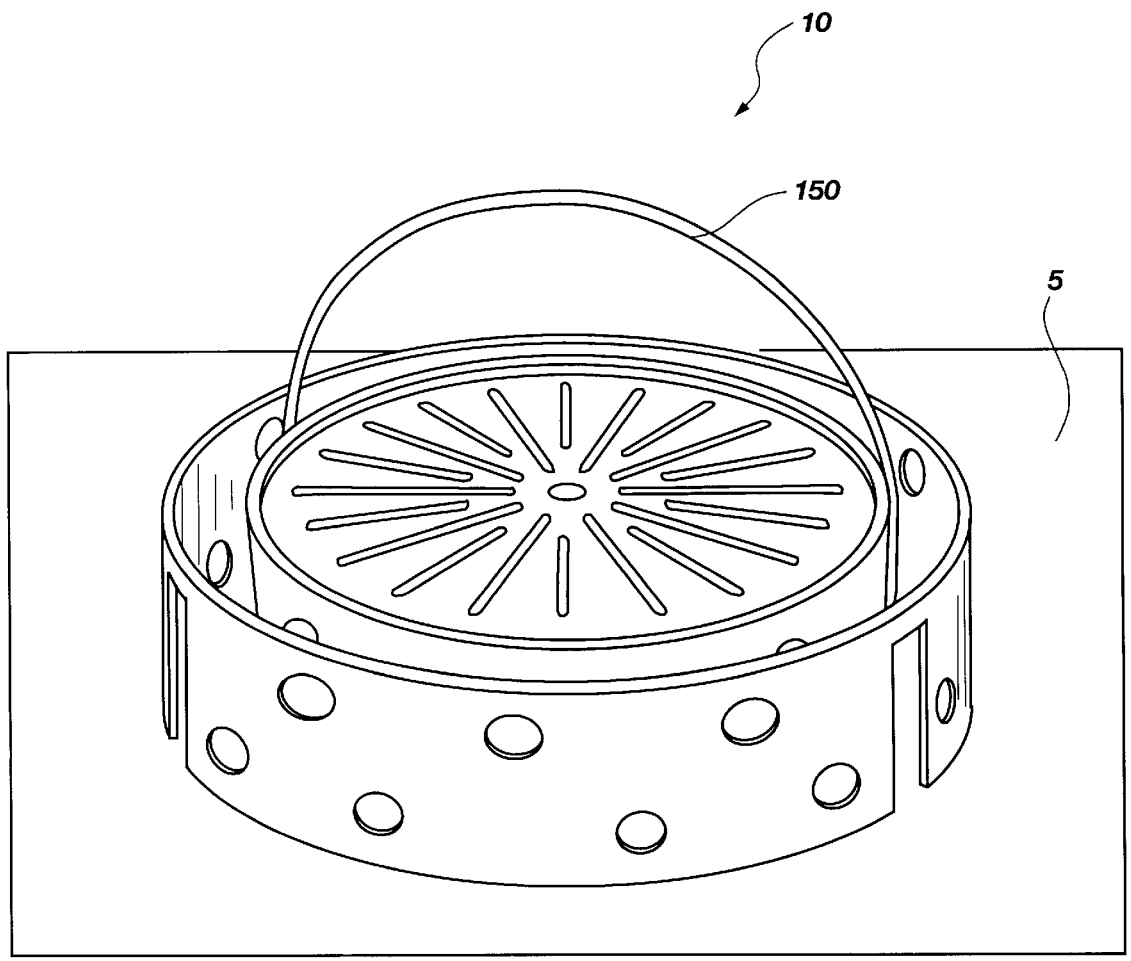
FIG. 10 is a perspective view of the collapsible cooking stove in the collapsed condition in accordance with the invention.

As shown in the cross-sectional view of FIG. 7, in the collapsed position, the leg 110 and linkage 115 are nearly parallel with the base plate 82 of lower housing 80. Also, the upper housing 20 and fire chamber assembly 40 are resting within lower housing 80, wherein the lower edge 23 of frustoconical outer wall 21 is free to rest upon the upper surface 92 of base plate 82 in lower housing 80. To uncollapse the collapsible stove 10, the upper housing 20 is lifted upwards (preferably using bail 150 as shown in FIG. 10) by the operator, allowing the upper housing 20 to separate from lower housing 80, generally with the assistance of gravity pulling down on the lower housing 80. As the upper housing 20 and attached brackets 39 begin to separate from lower housing 80 and accompanying brackets 99, the leg mechanisms 100 begin to unfold as the legs 110 and linkages 115 begin to rotate outward. FIGS. 8 and 9 show the collapsible stove 10 in various stages between the collapsed and uncollapsed conditions of the collapsible stove 10. FIG. 10 shows a perspective view of the collapsible stove 10 resting on a surface 5 in the folded-up, collapsed condition. To ready the collapsible stove 10 for cooking, the user can uncollapse the collapsible stove 10 by simply pulling upwards on bail 150, causing the upper and lower housings 20, 80 and the collapsing leg mechanisms 100 to automatically unfold and lock the collapsible stove 10 in the uncollapsed position as shown in FIG. 11.

Figure 11:
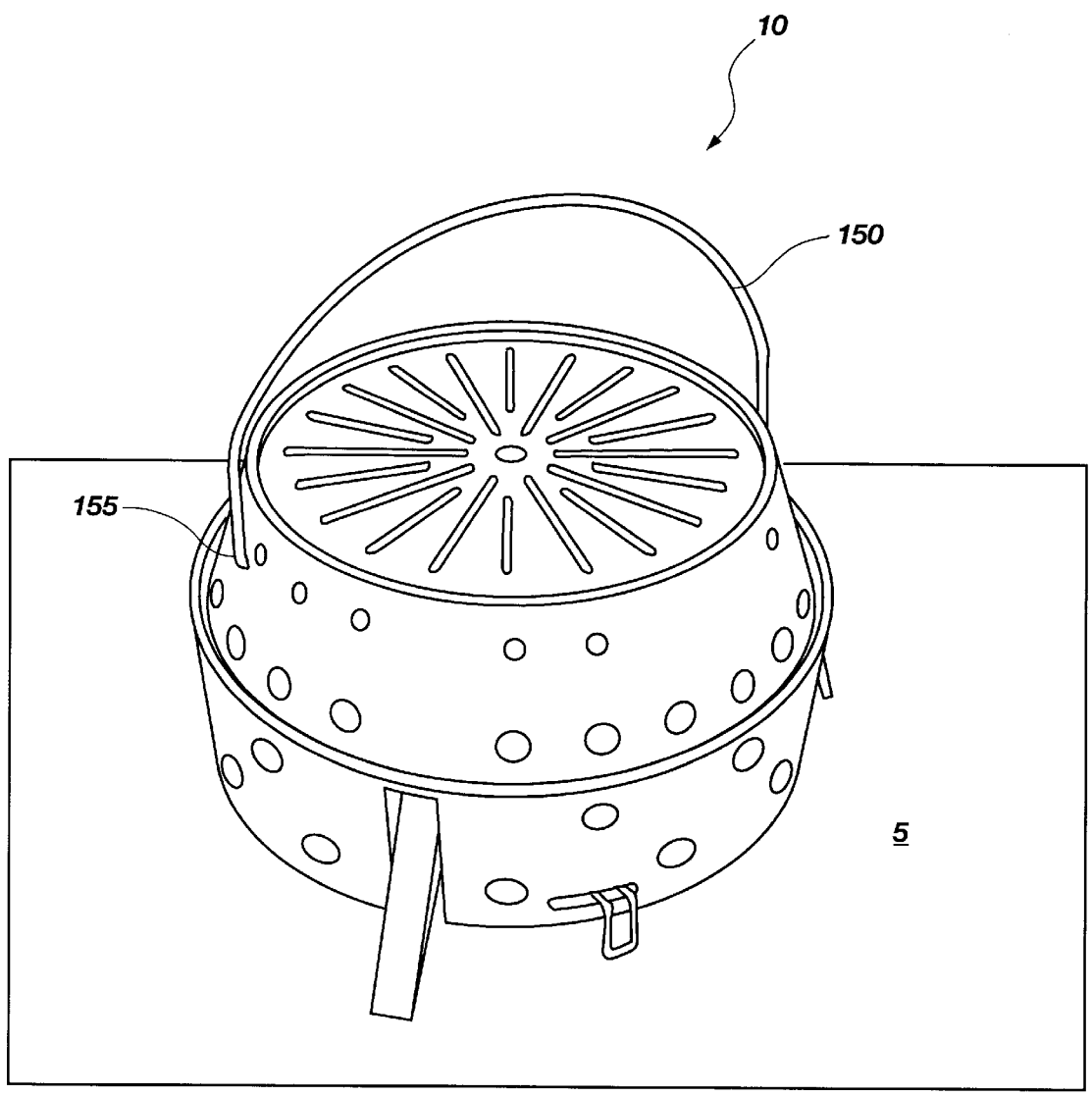
FIG. 11 is a perspective view of the collapsible cooking stove in the uncollapsed condition in accordance with the invention.

Referring to FIG. 11 a perspective view of the collapsible stove 10 in the uncollapsed position is shown. The bail 150 is preferably a metal dowel formed in a bail-like shape and may be rotatably affixed to the stove by simply inserting the ends of the bail into clearance holes 155 in the upper housing 20. Any other suitable means known to one of skill in the art, such as the use of bushings or bearings, spring-loading of the bail ends within the holes 155, or the use of brackets and fasteners, may be used to affix the bail 150 to the upper housing 20.

Referring again to FIG. 5, when the upper housing 20 is fully separated from the lower housing 80, the flange 50 on cylinder 64 of fire housing 44 rests upon the top of the flange 31 of upper housing 20. Similarly, the flanges 79 of retaining clasps 77 rest against the outer surface 93 of base plate 82 on lower housing 80. Additionally, when the upper housing 20 and lower housing 80 are fully separated, the legs 110 are rotated outwards until the linkages 115 are fully extended in approximately a horizontal position (parallel with base plate 82).

Therefore, in the uncollapsed position, the upper housing 20 is supported above surface 5 through the legs 110 and rigidly attached brackets 39. The fire chamber assembly 40 and lower housing 80 are suspended above the surface 5 by the legs 110 and upper housing 20 through: (1) the interaction between the two flanges 31, 50; (2) the interface of flanges 79 against the base plate 82; and (3) the connection of lower housing 80 to the legs 110 via linkages 115. The dimensions of the legs 110 and linkages 115 are selected such that, in the uncollapsed position, the legs 110 are essentially locked in position and the connection between the lower housing 80 and legs 110 via the linkages 115 becomes a rigid connection. Thus, a downward force (including the weight of the collapsible stove 10 itself) applied to the upper housing 20 will not rotate the legs 110 further outward or collapse the collapsible stove 10.

The collapsible stove 10 can be collapsed by applying an upward force to the lower housing 80, preferably by grasping the lower edge 97 of cylinder 81. Referring to FIGS. 5 and 6, by applying an upward force to the lower housing 80, the brackets 99 move upward, rotating the linkages 115 and attached legs 110 inward. Also, upward movement of the lower housing 80 relative to the upper housing 20 relieves the interference contact between the two flanges 31, 50, and between the flanges 79 and base plate 82. To fully collapse the collapsible stove 10, an upward force is applied to the lower housing 80 until the lower housing 80 encloses the fire chamber assembly 40 and upper housing 20, and the legs 110 and linkages 115 are resting adjacent the outer surface 93 of base plate 82 within the cylindrical region 85 formed by the lower edge 97 extending down from cylinder 81. In the collapsed condition, both the overall volume and the aspect ratio (ratio of height over diameter) of the collapsible stove 10 are greatly reduced in comparison to other, non-collapsible stoves found in the prior art. The reduction in volume and aspect ratio facilitates storage and transportation of the collapsible stove 10 while not in use.

To use the collapsible stove 10, the collapsible stove 10 is uncollapsed by lifting up on the bail 150 and allowing the combined weight of the lower housing 80 and fire chamber assembly 40 to separate the two housings 20, 80 and unfold the collapsing leg mechanisms 100. Once the collapsible stove 10 is uncollapsed, fuel is placed on the fuel grate 41 and then lit using any standard lighter fluid and an ignition source. Charcoal briquettes are the preferred fuel though any other suitable fuel, such as wood chips, may be used. Once the fuel is ready for cooking, the cooking plate 130 (FIG. 1) may be located on the plate supports 35 atop upper housing 20. Food may then be placed on the upper surface 131 of cooking plate 130 for cooking. Cooking time and temperature may be varied by using the vent control lever 43 to adjust the rate of air flow into the fuel.

Figure 14A:
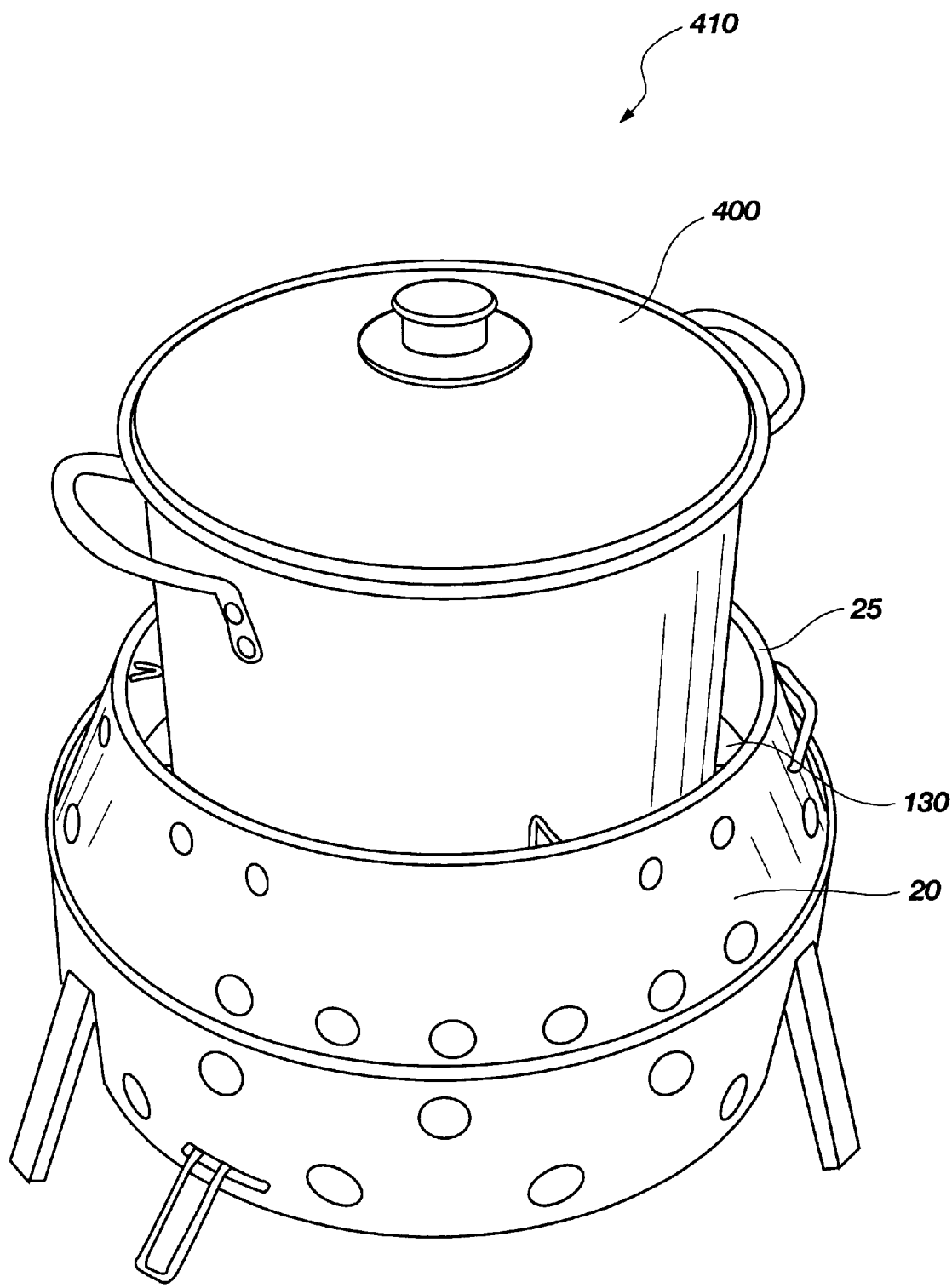
FIGS. 14A and 14B are perspective views of a collapsible cooking stove being used in conjunction with a cooking pot in accordance with the invention.
Figure 14B:
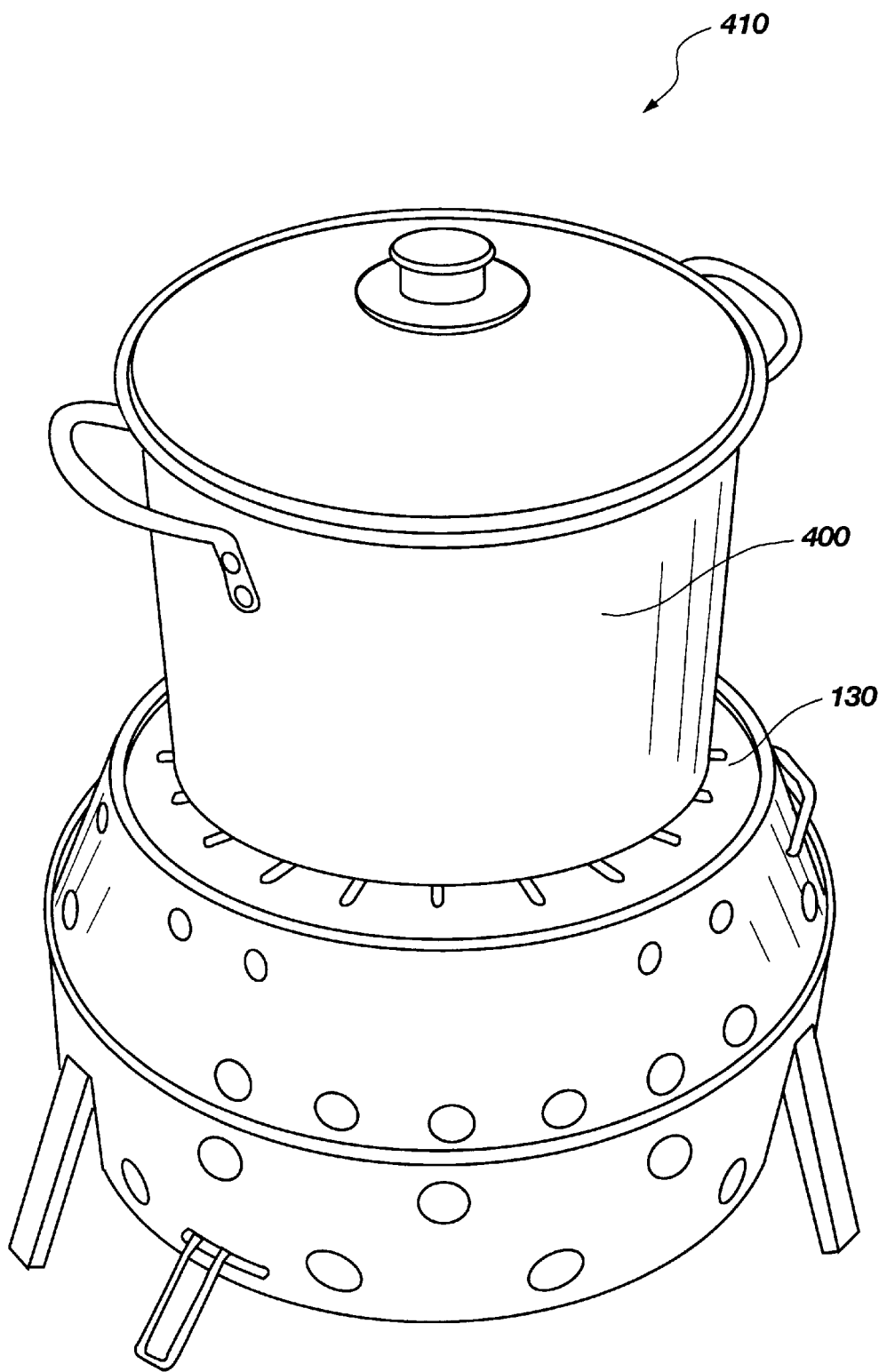

Preferably, a series of openings 56 (such as holes and slots) is cut through cooking plate 130 in order to facilitate cooking directly on the upper surface of the cooking plate 130 and to allow for the drainage of fluids, such as grease. Alternatively, cooking utensils, such as frying pans, pots, and steamers, may be placed on the upper surface 131 of cooking plate 130. The cooking plate 130 may be a flat plate as shown in FIGS. 1, 14A and 14B or, in an alternative embodiment, the cooking plate 130 may be a standard barbeque grill comprised of rods and stringers as is well known in the art.

Another variation of the cooking plate 130 described above includes two cooking plates 130 placed on top of each other either in the upper position resting on the cantilevered plate supports 35 or in the center position and also including rotating means for causing the plates to rotate relative to one another. The rotating means may be similar to that described above for the alternative fire chamber assembly 40 wherein one of the cooking plates 130 has an angular slot in it. By placing a shaft or rod through the angular slot and a radial slot in the other cooking plate 130, the cooking plates may be caused to rotate relative to one another. This feature is useful to eliminate flare-ups caused by burning grease or other materials. This feature also allows the user to adjust the heat delivered to the bottom of a wok, cooking pot, fry pan or other cooking appliance used with the collapsible stove 10.

The collapsible stove 10 of the present invention may be constructed of any suitable materials as known in the art. Preferably, the collapsible stove 10 is constructed of durable, heat- and corrosion-resistant metals such as treated steels or stainless steel. However, it will be appreciated by those skilled in the art that aluminum or advanced materials such as composites or high-temperature polymers may be used to reduce the total weight of the collapsible stove 10. The various parts of the collapsible stove 10 may be formed using standard fabrication techniques as known in the pertinent art, and the parts may be joined using any suitable fastening method such as rivets, screws, or welding.

Figure 12:
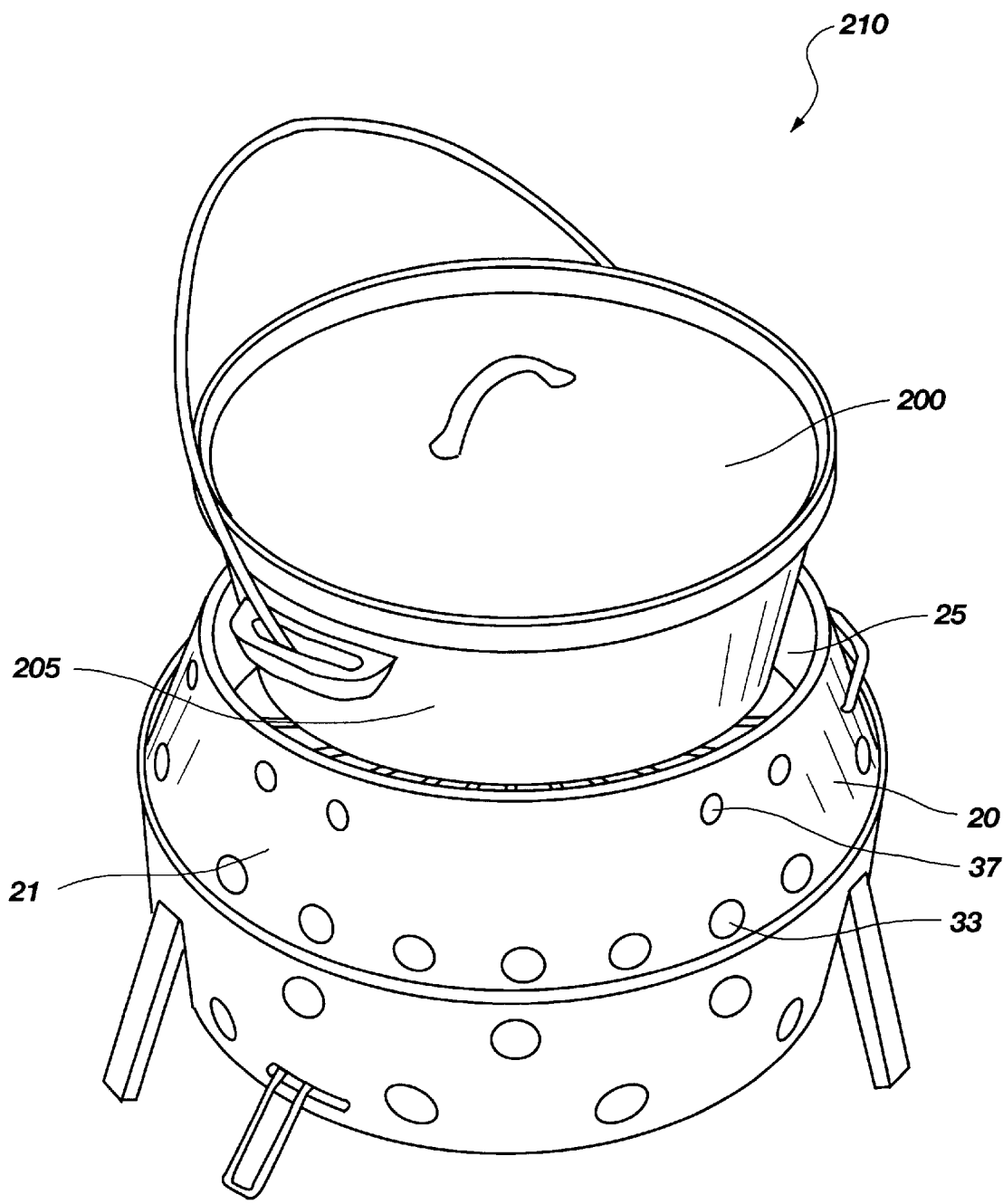
FIG. 12 is a perspective view of a collapsible cooking stove being used in conjunction with a Dutch oven in accordance with the invention.

In the alternative embodiment of a cooking stove 210 shown in FIG. 12, the cooking plate 130 has been removed from the upper housing 20. Fuel is placed on the fuel grate 41 (not shown) and a Dutch oven 200 has been inserted into the cylindrical cavity 25 of upper housing 20. The lower surface of Dutch oven 200 may rest on the fuel grate 41. Alternatively, an interference fit may be formed by the engagement of the outer surface of Dutch oven 200 with the inside surface 26 (see FIG. 2) of the cylindrical wall inner 22 (see FIG. 2) on the upper housing 20 (see FIG. 2), depending on the size of the Dutch oven 200. Combustion gases and smoke may escape the cylindrical cavity 25 through the air holes 33, 37 disposed in the frustoconical outer wall 21 of upper housing 20. If the dimensions of the Dutch oven 200 as shown in FIG. 12 are such that no interference fit is formed when the Dutch oven 200 is inserted into cylindrical cavity 25, the cooking plate 130 may be placed atop the flange 50 of fire housing 44. In the uncollapsed position (see FIG. 5), the flange 50 of cylinder 64 of fire housing 44 rests on top of, and adjacent to, the flange 31 of upper housing 20. Preferably, a slot 133 (see FIG. 1) is disposed on the outer circumference of cooking plate 130 that is of appropriate shape and size to allow the cooking plate 130 to by-pass the cantilevered plate supports 35 while lowering the cooking plate 130 onto flange 50. With the cooking plate 130 resting atop flange 50, a small Dutch oven 200 may be placed on the upper surface 131 of cooking plate 130.

Figure 13:
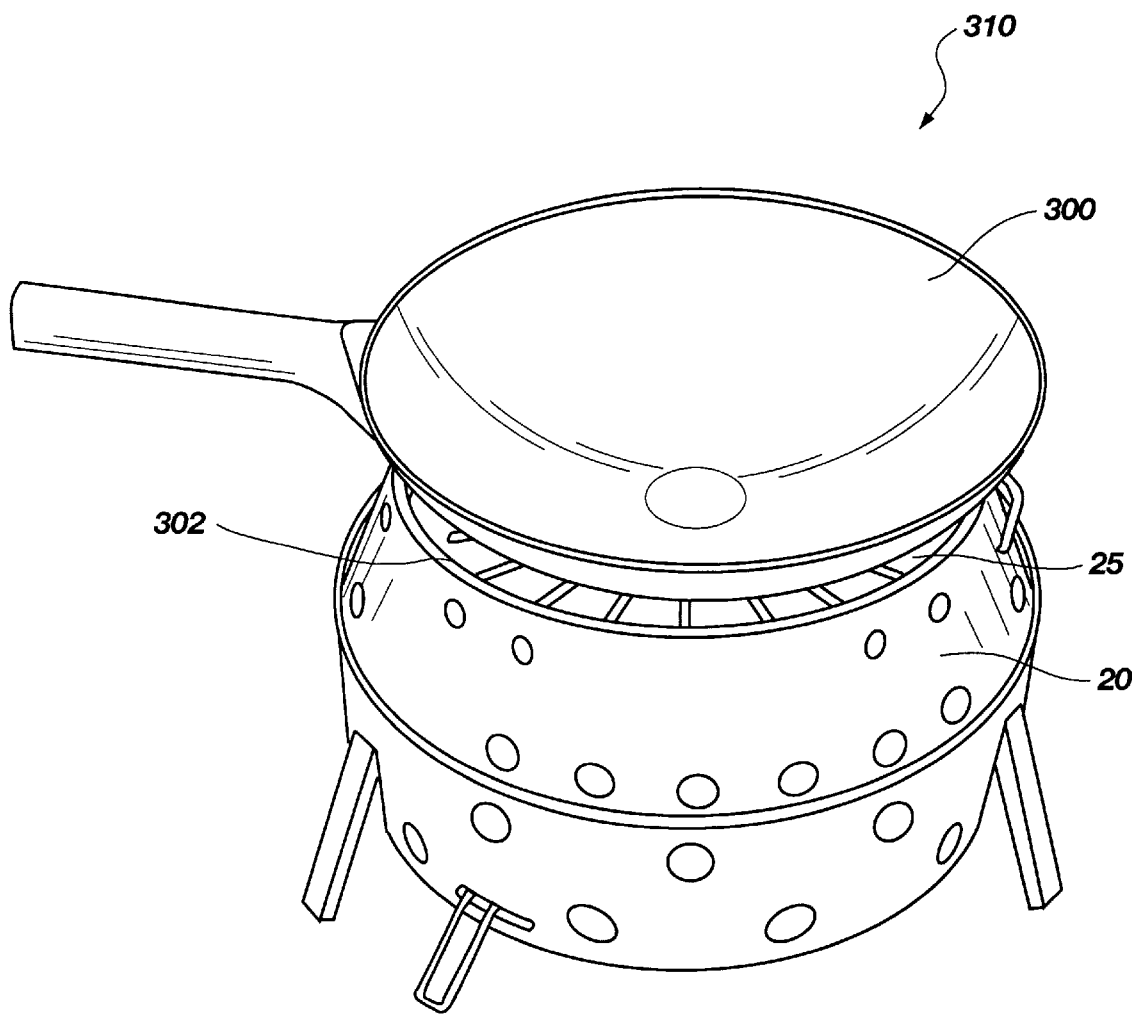
FIG. 13 is a perspective view of a collapsible cooking stove being used in conjunction with a wok in accordance with the invention.

FIG. 13 illustrates yet another alternative embodiment of a cooking stove 310. As shown in FIG. 13, a wok 300 is inserted into the cylindrical cavity 25 of upper housing 20. When using a smaller wok 300 in the cooking stove 310, wok 300 may rest directly on the cooking plate 130 and be partially supported by the rim 302 or cantilevered plate supports 35 (not shown). Where a larger wok 300 is used in the cooking stove 310, the wok 300 may be supported by the rim 302 or cantilevered plate supports 35 only.

FIGS. 14A and 14B illustrate still yet another alternative embodiment of a cooking stove 410. As shown in FIG. 14A, a cooking pot 400 is inserted into the cylindrical cavity 25 of upper housing 20 and is supported by the cooking plate 130, as placed in the center position. As shown in FIG. 14B, a cooking pot 400 is placed on the cooking plate 130, as placed in the top position and supported by the cantilevered plate supports 35 (not shown).

Figure 15:
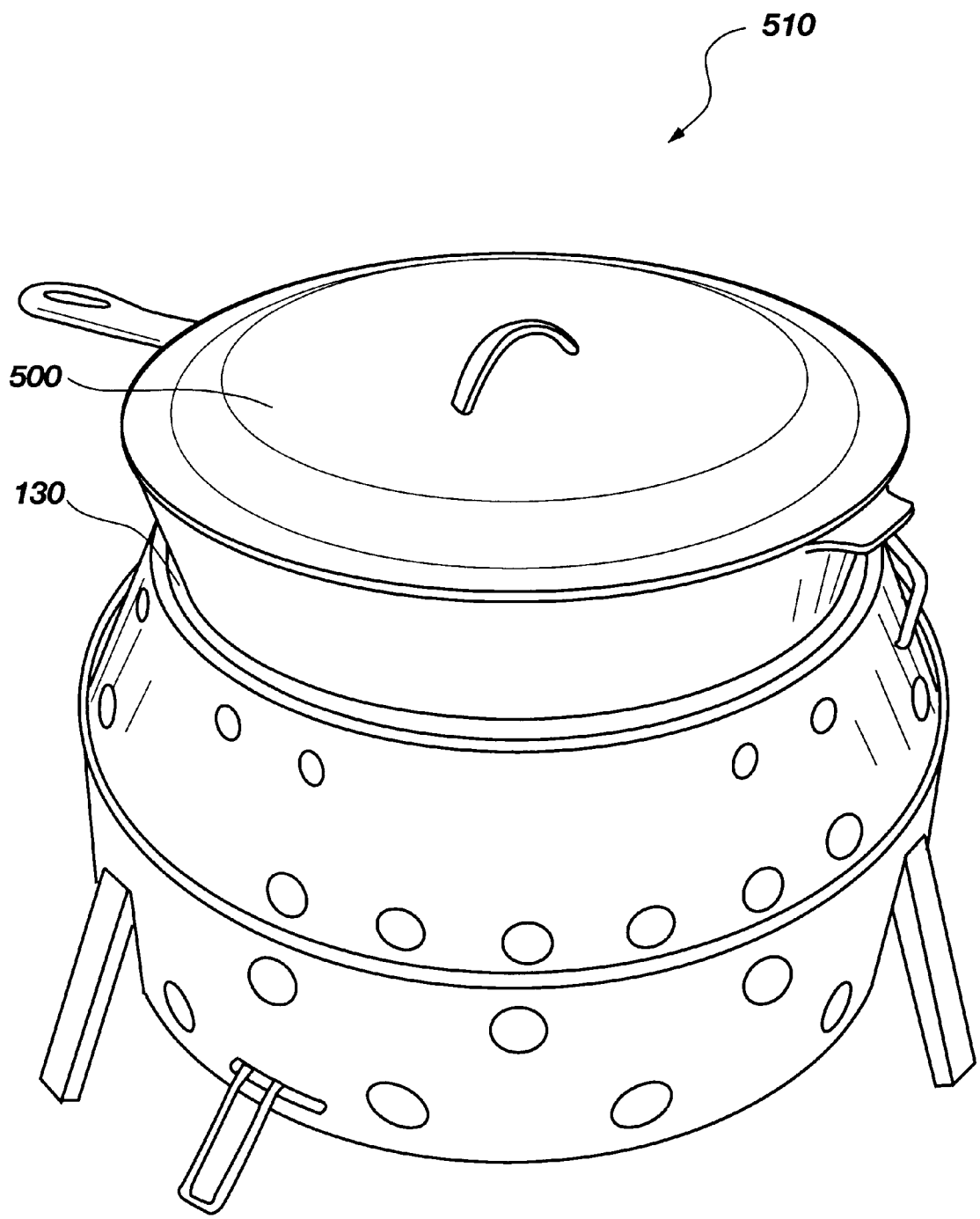
FIG. 15 is a perspective view of a collapsible cooking stove being used in conjunction with a frying pan in accordance with the invention.

FIG. 15 is a perspective view of an additional embodiment of a cooking stove 510. As shown in FIG. 15, a frying pan 500 is shown resting on the cooking plate 130 of this embodiment of a collapsible stove 510. Frying pan 500 may be cast iron (as shown) or of any other conventional style and/or material.

Figure 16:
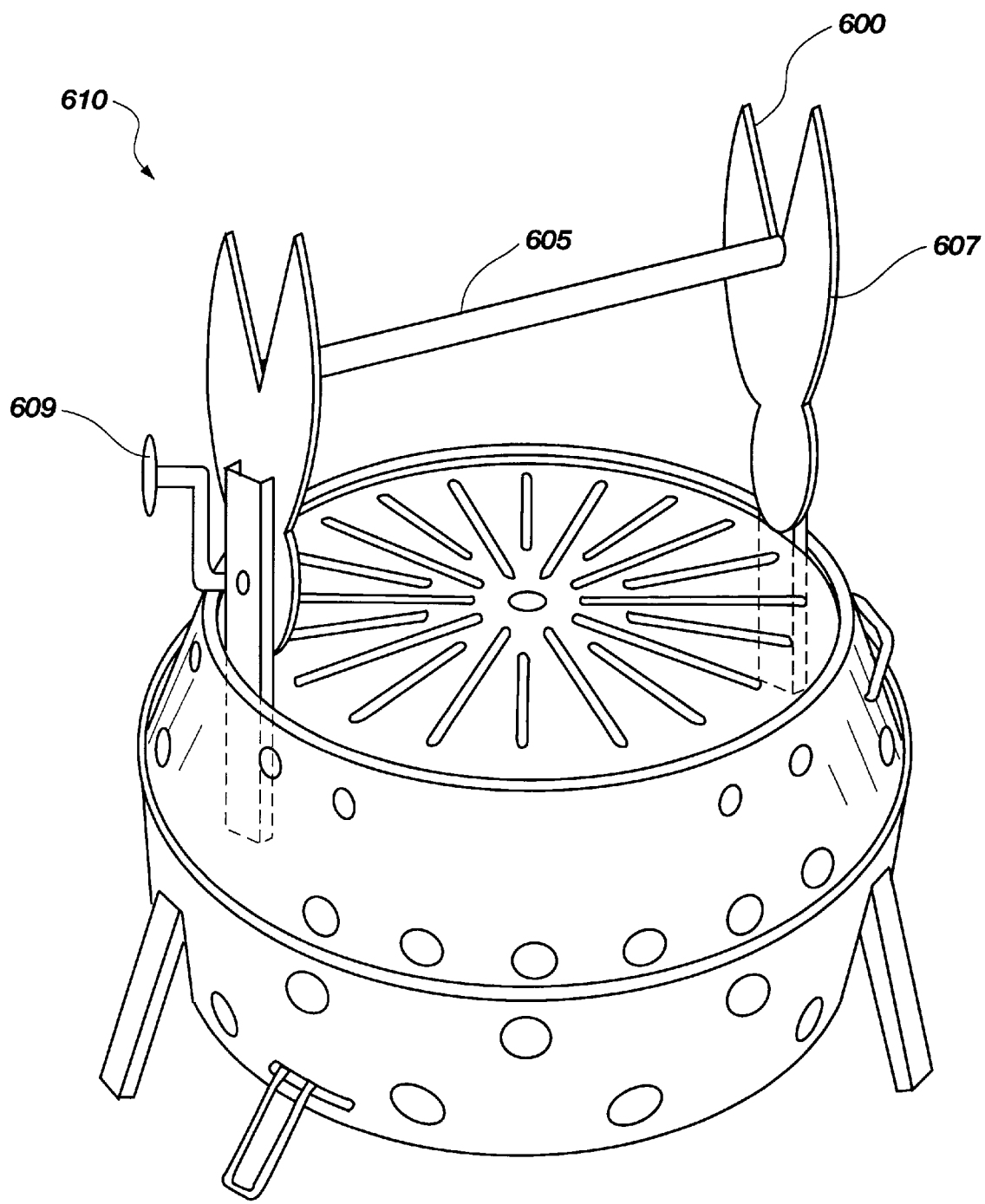
FIG. 16 is a perspective view of a collapsible cooking stove with an attached rotisserie in accordance with the invention.

FIG. 16 shows a further alternative embodiment of the present invention. Referring to FIG. 16, the cooking stove 610 of the present invention is shown in the uncollapsed position and the cooking plate 130 has been removed. Disposed on the upper housing 20 of the collapsible stove 10 is a rotisserie 600. The rotisserie 600 is comprised of a rotating spit 605, two opposing supports 607, and a rotation device 609. In the preferred embodiment, the supports 607 are brackets removably attached to the upper housing 20. Alternatively, the supports 607 may be formed as notches (not shown) disposed on the upper edge (at flange 32) of upper housing 20. The supports 607 are spaced 180 degrees apart and are of such shape and dimension as to allow the spit 605 to freely rotate therein. Food is placed on the rotating spit 605, and the rotation device 609 rotates the spit 605 within the supports 607 as necessary to effect cooking. To facilitate manual rotation of the spit 605, the rotation device 609 may include a crank arm (as shown in FIG. 16) affixed to the spit 605 or, alternatively, the rotation device 609 may be coupled with the spit 605 by means of a gear train. In a further embodiment of the present invention, the rotation device 609 may be an electrically powered motor.

Figure 17A:
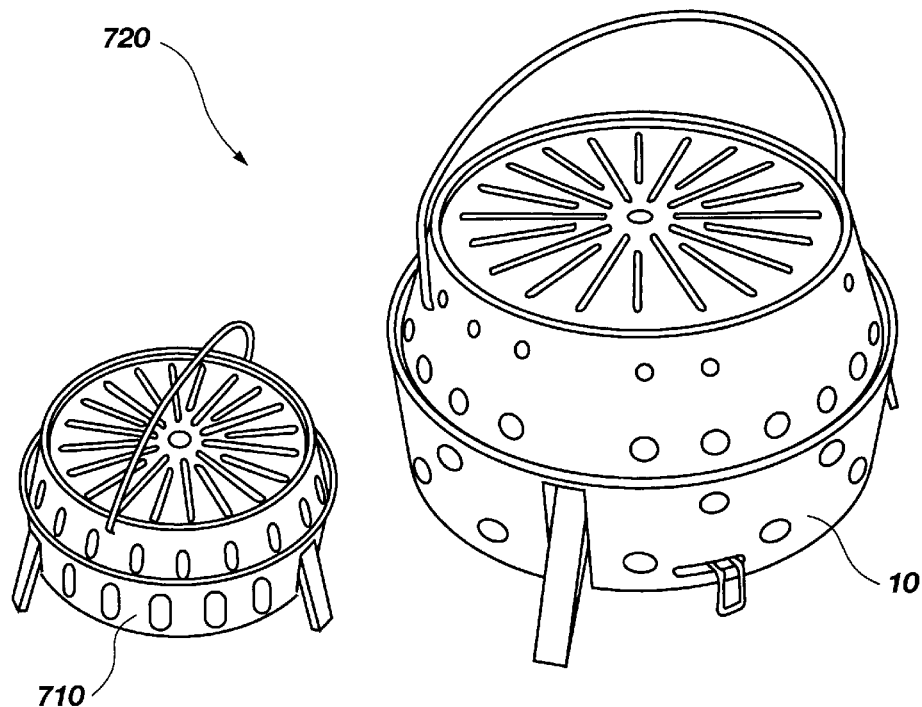
FIG. 17A is a perspective view of two collapsible cooking stoves, both shown uncollapsed, one of which is sized small enough to be placed within the other.
Figure 17B:
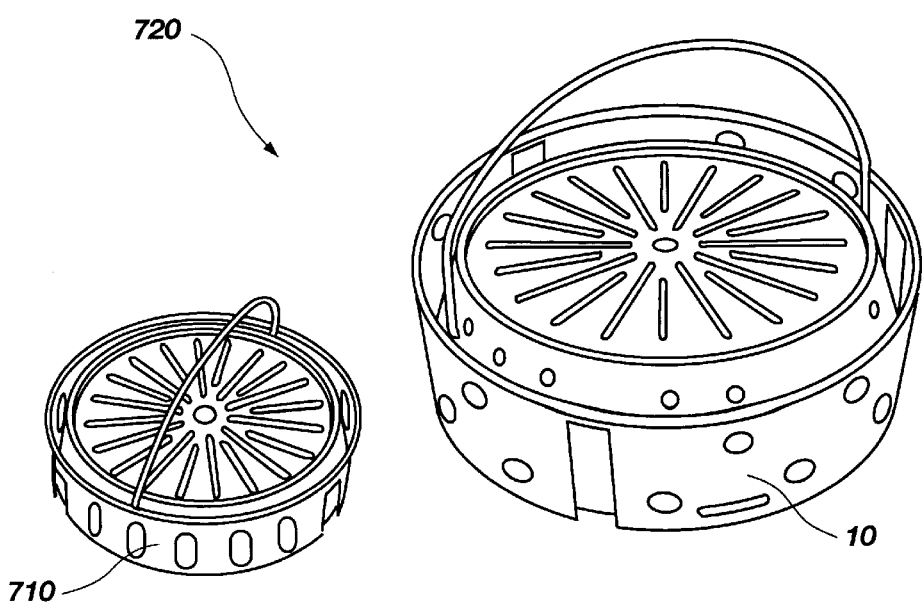
FIG. 17B is a perspective view of two collapsible cooking stoves, both shown collapsed, one of which is sized small enough to be placed within the other.
Figure 17C:
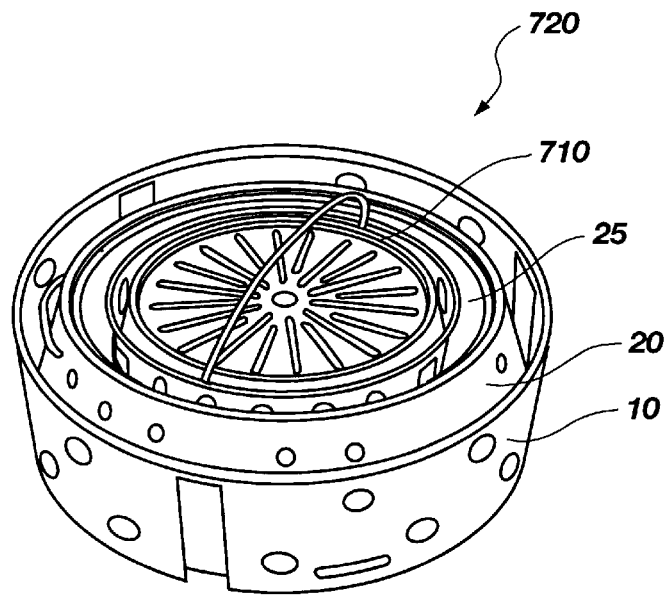
FIG. 17C is a perspective view of two collapsible cooking stoves, the smaller of which is nested insider the other.
Figure 17D:
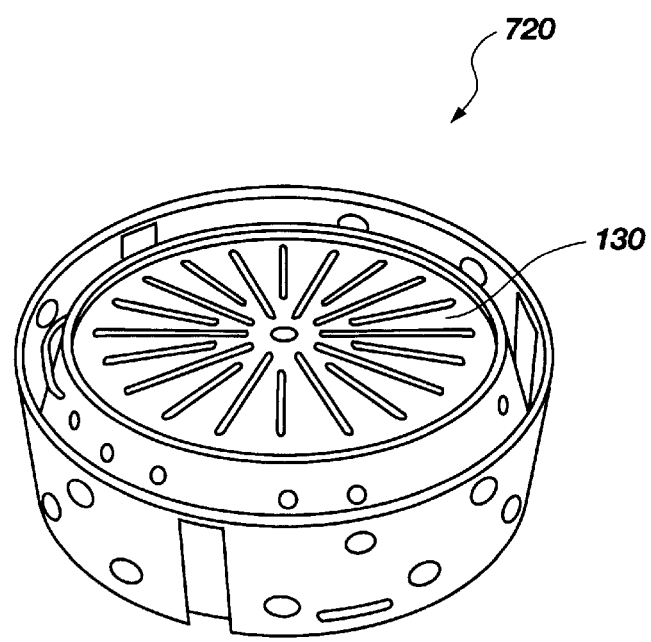
FIG. 17D is another perspective view of two collapsible cooking stoves as shown in FIG. 17C, wherein the smaller stove is hidden underneath the cooking plate of the larger stove.

FIGS. 17A, 17B, 17C and 17D illustrate perspective views of another alternative embodiment of a collapsible cooking stove 720. Referring to FIG. 17A, the collapsible stove 10 of the present invention is shown in the uncollapsed position along side a smaller collapsible stove 710, also in the uncollapsed position. FIG. 17B is a perspective view of the collapsible stove 10 of the present invention shown in the collapsed position along side a smaller collapsible stove 710, also in the collapsed position. FIG. 17C illustrates a nested collapsible stove combination 720 including a smaller collapsible stove 710 disposed inside the cylindrical cavity 25 of upper housing 20 of the collapsible stove 10. In FIG. 17C, the collapsible stove 10 is shown without the cooking plate 130. The smaller collapsible stove 710 may be identical to the collapsible stove 10, except smaller in size than collapsible stove 10. The dimensions of the smaller stove 710 are such that, when in the collapsed condition, the smaller stove 710 can be removably disposed inside the cylindrical cavity 25 of upper housing 20 on the collapsible stove 10. FIG. 17D illustrates a nested collapsible stove combination 720 including a smaller collapsible stove 710 disposed inside the cylindrical cavity 25 (hidden underneath the cooking plate 130 shown in the upper position). When the two collapsible stoves 10, 710 are stowed together in combination 720 as described, the total volume of the two collapsible stoves 10, 710 combined will not exceed the volume of the collapsible stove 10 alone. Thus, a user can have the benefit of two separate cooking stoves without any increase in storage space requirements.

Figure 18:
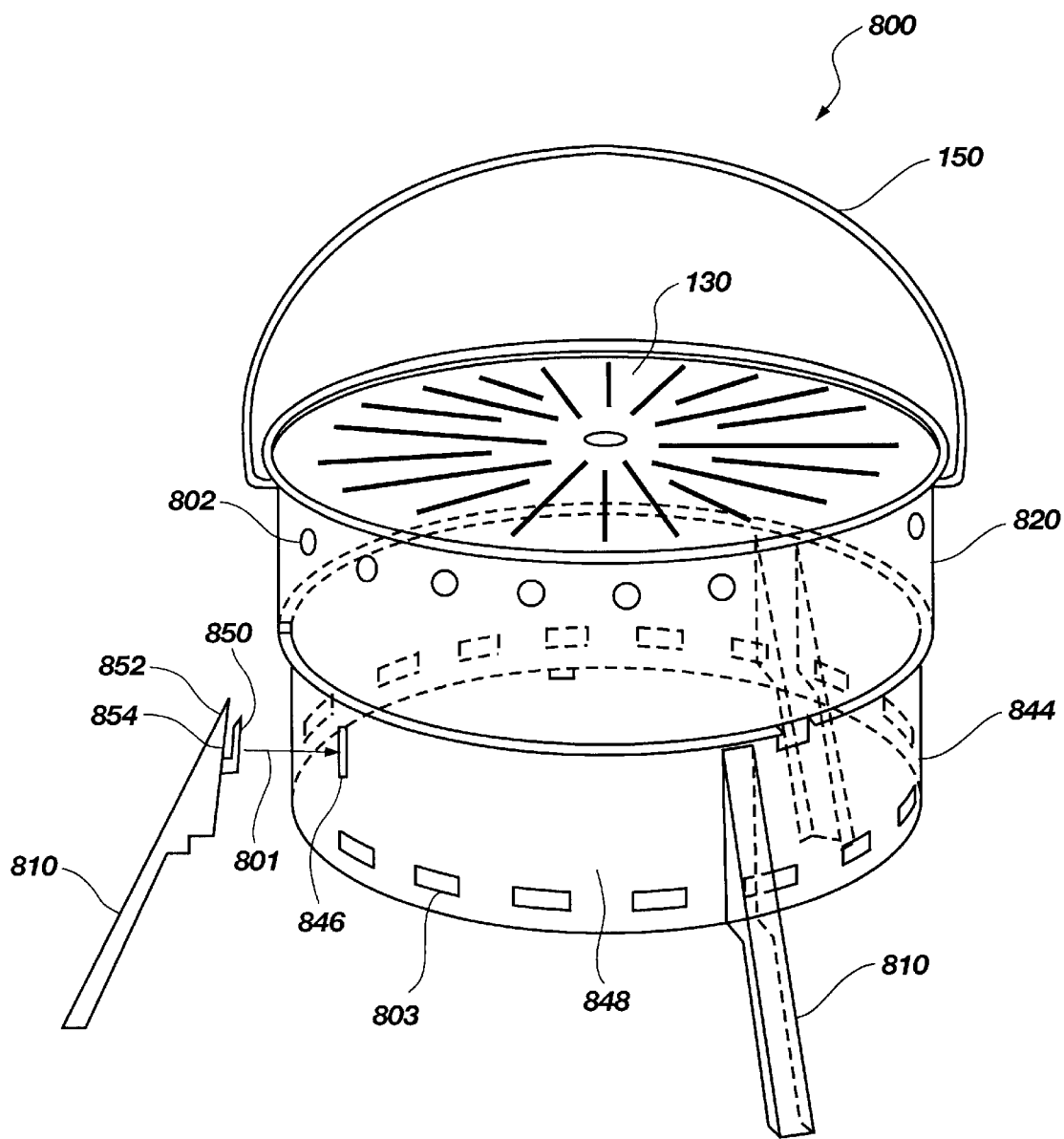
FIG. 18 is a perspective view of an alternative embodiment of a cooking stove in accordance with the invention.

Referring to FIG. 18, yet another alternative embodiment of a collapsible cooking stove 800 is shown. Collapsible cooking stove 800 may include a lower fire housing 844, an upper housing 820, a plurality of detachable legs 810, a removable cooking plate 130 and an optional bail 150. In this embodiment of a collapsible cooking stove 800, the upper housing 820 is slidably coupled to the lower fire housing 844 by slidable coupling means 801. Slidable coupling means 801 may include a guide slot in the lower fire housing 844 and a rib in the upper housing 820, or spring loaded tangs affixed either to the lower fire housing 844 or the upper housing 820 or any other suitable slidable coupling means 801 known to one of ordinary skill in the art. Preferably, the slidable coupling means 801 locks when the stove 800 is placed in the uncollapsed position as illustrated in FIG. 18. Where spring loaded tangs are used as the slidable coupling means 801, the uncollapsed stove 800 may be collapsed by compressing the spring loaded tangs to unlock the slidable coupling means 801 and allow the user to collapse the stove 800.

The detachable legs 810 may be carried within the stove 800 when collapsed, and placed in slots 846 within the lower fire housing wall 848 when in the uncollapsed position. Each detachable leg 810 may include an upward-pointing tang 850, which fits into slot 846, and allow the upper edge of slot 846 to rest within the notch 854 formed between the upward-pointing tang 850 and the upper portion 852 of the leg 810. Alternatively, each detachable leg 810 may include a downward-pointing tang (not shown) which fits into slot 846 and is held in place by the upper housing 820. The preferred embodiment of collapsible stove 800 includes three detachable legs 810. However, four or more detachable legs 810 may be used consistent with the invention. In the preferred embodiment of collapsible cooking stove 800, the upper housing 820 contains a plurality of ventilation holes 802 placed around the cylindrical surface of the upper housing 820. Similarly, the lower fire housing 844 includes a plurality of ventilation holes 803 placed around the lower fire housing wall 848.

Although this invention has been described with reference to particular embodiments, the invention is not limited to these described embodiments. Rather, it should be understood that the embodiments described herein are merely exemplary and that a person skilled in the art may make many variations and modifications without departing from the spirit and scope of the invention. For example, a person skilled in the art may combine any of the features illustrated or described in a given embodiment above in another embodiment which may not have such feature illustrated or described. It would also be within the scope of the invention to integrate two or more components described herein into a single component performing all of the functions of the original two or more components. All such variations and modifications are intended to be included within the scope of the invention as defined in the appended claims.

What is claimed is:

1. A collapsible cooking stove comprising:
   an upper housing;
   a fire chamber assembly slidably disposed within said upper housing;
   a plurality of collapsing leg mechanisms rotatably coupled to said upper housing; and
   a lower housing pivotally coupled to said plurality of collapsing leg mechanisms and slidably disposed around said upper housing, wherein moving said upper housing away from and out of said lower housing along a common axis unfolds said collapsing leg mechanisms for placement on a surface, thereby collapsing said cooking stove, and wherein moving said lower housing toward and into said upper housing along said common axis folds said collapsing leg mechanisms and collapses said cooking stove for storage.

2. The collapsible cooking stove of claim 1, wherein said upper housing further includes a bail rotatably coupled thereto for carrying and uncollapsing said cooking stove.

3. The collapsible cooking stove of claim 2, wherein said moving said upper housing away from and out of said lower housing along said common axis is effected by applying an upward force to said bail.

4. The collapsible cooking stove of claim 1, wherein said upper housing further includes an inner wall forming a top opening and a bottom opening and an inward-facing flange disposed about a perimeter of said bottom opening for holding said fire chamber assembly.

5. The collapsible cooking stove of claim 4, wherein said fire chamber assembly includes an outward-facing flange configured for abutting against said inward facing flange and including at least one retaining clasp for coupling to said lower housing.

6. The collapsible cooking stove of claim 1, wherein said moving said lower housing toward and into said upper housing along said common axis is effected by applying an upward force to said lower housing.

7. A collapsible cooking stove comprising:
   a lower housing including a base plate and a lower housing wall extending around a perimeter of said base plate forming a top opening, and including at least one retaining surface disposed on said base plate;
   an upper housing slidably disposed within said top opening of said lower housing, said upper housing including at least one inner wall forming a top opening and a bottom opening, and further including an inward-facing flange disposed about a perimeter of said bottom opening of said at least one inner wall;
   a fire chamber assembly for combustion of a solid fuel slidably disposed within said upper housing and said lower housing, said fire chamber assembly including an outward-facing flange capable of abutting said at least one retaining surface; and at least three collapsing leg mechanisms, each including a leg member rotatably affixed to said upper housing, and further including a rigid linkage member with one end thereof rotationally affixed to said leg member and an opposing end thereof rotationally affixed to said lower housing, wherein motion of said lower housing relative to said upper housing effects rotation of said leg member and said linkage member.

8. The collapsible stove of claim 7, wherein said inward-facing flange of the upper housing abuts the outward-facing flange of the fire chamber assembly and said at least one retaining clasp of the fire chamber assembly abuts the at least one retaining surface of said base plate of the lower housing.

9. The collapsible cooking stove of claim 7, wherein said top opening of said upper housing is configured to receive a cooking utensil selected from the group consisting of a cooking plate, a grill, a wok, a Dutch oven, and a rotisserie.

10. The collapsible cooking stove of claim 7, wherein said fire chamber assembly further includes:

a fire housing including a wall forming a chamber with a top opening and a bottom opening, and further including at least one fire housing vent hole, wherein said outward-facing flange is disposed about a perimeter of the top opening of said fire housing and said at least one retaining clasp is disposed on a perimeter of the bottom opening of said fire housing;

a fuel pan for combustion of the solid fuel slidably disposed within said fire housing including a base surface and a pan wall extending around a perimeter of said base surface forming a top opening, and further including at least one pan vent hole disposed on said pan wall and lying in the same horizontal plane as said fire housing vent hole; and a vent control lever rigidly attached to said fuel pan and including a first end thereof extending through an opening in said lower housing and a second opposing end thereof extending through a second opening in said lower housing, wherein movement of said fuel pan and attached vent control lever within said fire housing effects motion of the at least one pan vent hole relative to the at least one fire housing vent hole.

11. The collapsible cooking stove of claim 10, further including at least one fuel grate for supporting solid fuel disposed within said fuel pan.

12. The collapsible cooking stove of claim 11, further including at least one fuel grate support within said fuel pan disposed on said pan wall proximate the top opening of said fuel pan for supporting said at least one fuel grate.

13. The collapsible cooking stove of claim 12, wherein the number of fuel grate supports equals three.

14. The collapsible cooking stove of claim 7, further including a bail rotatably affixed to said upper housing for uncollapsing and carrying said collapsible cooking stove.

15. The collapsible cooking stove of claim 7, further including:

an outer wall forming a top opening congruent with, and rigidly attached to, the top opening of said at least one inner wall of said upper housing, said outer wall further including a bottom opening larger in dimension than the bottom opening of said at least one inner wall;

at least one outer wall air hole disposed on the outer wall of said upper housing;

at least one inner wall air hole disposed on the at least one ineer wall of said upper housing; and at least one lower housing air hole disposed on said lower housing wall.

16. The collapsible cooking stove of claim 15, further including at least one and said at least one inner wall air hole are approximately concentric.

17. The collapsible cooking stove of claim 7, further including at least one cooking plate support for supporting a cooking plate within the upper housing disposed on said at least one inner wall of said upper housing proximate the top opening of said at least one inner wall.

18. The collapsible cooking stove of claim 17, wherein the number of cooking plate supports equals three.

19. A method of forming a collapsible cooking stove, comprising:

providing a lower housing assembly;

providing an upper housing assembly slidably disposed within said lower housing assembly;

providing a fire chamber assembly for combustion of a solid fuel slidably disposed within said upper housing assembly and said lower housing assembly, and wherein said fire chamber assembly slidably interconnects said upper housing assembly with said lower housing assembly;

providing at least one cantilevered leg for supporting said lower housing assembly, said upper housing assembly, and said fire chamber assembly;

rotationally coupling said at least one cantilevered leg to said lower housing assembly and to said upper housing assembly, and wherein a motion of said lower housing assembly relative to said upper housing assembly will effect rotation of said at least one cantilevered leg.

20. The method of forming a collapsible cooking stove according to claim 19, further comprising the step of providing a utensil for handling food disposed on the upper housing assembly.

21. The method of forming a collapsible cooking stove according to claim 20, wherein said utensil is selected from the group consisting of a cooking plate, a grill, a wok, a Dutch oven, and a rotisserie.

* * * * *